US008784598B1

(12) United States Patent
Valenti, Jr. et al.

(10) Patent No.: US 8,784,598 B1
(45) Date of Patent: *Jul. 22, 2014

(54) AUTO-APPLIED LABEL SYSTEMS

(71) Applicant: Chicago Tag & Label, Inc., Libertyville, IL (US)

(72) Inventors: F. Paul Valenti, Jr., Barrington, IL (US); Carl Opel, Carol Stream, IL (US); Daniel Hedger, Grayslake, IL (US)

(73) Assignee: Chicago Tag & Label, Inc., Libertyville, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 13/869,052

(22) Filed: Apr. 24, 2013

Related U.S. Application Data

(63) Continuation of application No. 12/965,139, filed on Dec. 10, 2010, now abandoned, which is a continuation-in-part of application No. 12/951,232, filed on Nov. 22, 2010, now Pat. No. 8,142,596.

(51) Int. Cl.
*B29C 65/48* (2006.01)
*B32B 37/10* (2006.01)
*B32B 38/10* (2006.01)
*B32B 38/18* (2006.01)
*B32B 43/00* (2006.01)

(52) U.S. Cl.
USPC .......................................... 156/247; 156/289

(58) Field of Classification Search
USPC ......... 156/196, 199, 202, 204, 217, 226, 227, 156/230, 238–241, 247, 249, 277, 289, 250, 156/257, 387, 540–542, 556, 566, 580, 581, 156/569, 572, 515, 443, 477.1, 478–480, 156/483, 475, 583.8, DIG. 1, DIG. 5, DIG. 8, 156/DIG. 23, DIG. 28, DIG. 33, DIG. 37, 156/DIG. 42
See application file for complete search history.

(56) References Cited

U.S. PATENT DOCUMENTS

| 4,255,220 A | 3/1981 | Kucheck et al. |
| 4,951,970 A | 8/1990 | Burt |
| 5,337,663 A | 8/1994 | McKillip |
| 5,376,217 A | 12/1994 | Janssen, Jr. et al. |
| 5,413,384 A | 5/1995 | Principe et al. |
| 5,520,629 A | 5/1996 | Heinecke et al. |
| 5,785,804 A | 7/1998 | Kovacs et al. |
| 6,035,568 A | 3/2000 | Grosskopf et al. |
| 6,305,717 B1 | 10/2001 | Chess |
| 6,350,342 B1 | 2/2002 | Steidinger et al. |
| 6,378,588 B1 | 4/2002 | Nixon et al. |

(Continued)

FOREIGN PATENT DOCUMENTS

WO  WO9505976 A1  3/1995

*Primary Examiner* — Sing P Chan
(74) *Attorney, Agent, or Firm* — Ice Miller LLP

(57) ABSTRACT

Auto-applied packing list and upper label systems. A carrier material with an upper label and a lower label removeably adhered thereto is provided. The upper label and lower label are dispensed in sequence onto a label applicator apparatus. The label applicator apparatus applies the upper label and the lower label to a surface simultaneously, whereby after application the underside of the lower label is in contact with the surface and the undersurface of the upper label is in contact with the top side of the lower label.

38 Claims, 36 Drawing Sheets

(56) References Cited

U.S. PATENT DOCUMENTS

| | | |
|---|---|---|
| 6,451,149 B1 | 9/2002 | McKenney et al. |
| 6,511,569 B1 | 1/2003 | Nixon et al. |
| 6,857,714 B2 | 2/2005 | Hohberger et al. |
| 7,534,476 B2 | 5/2009 | Banks et al. |
| 7,762,302 B2 | 7/2010 | Dangami |
| 7,850,207 B1 | 12/2010 | Valenti et al. |
| 7,914,869 B2 | 3/2011 | Hodsdon et al. |
| 7,922,210 B1 | 4/2011 | Valenti et al. |
| 2003/0127180 A1 | 7/2003 | Williams |
| 2005/0126701 A1 | 6/2005 | Hodsdon et al. |

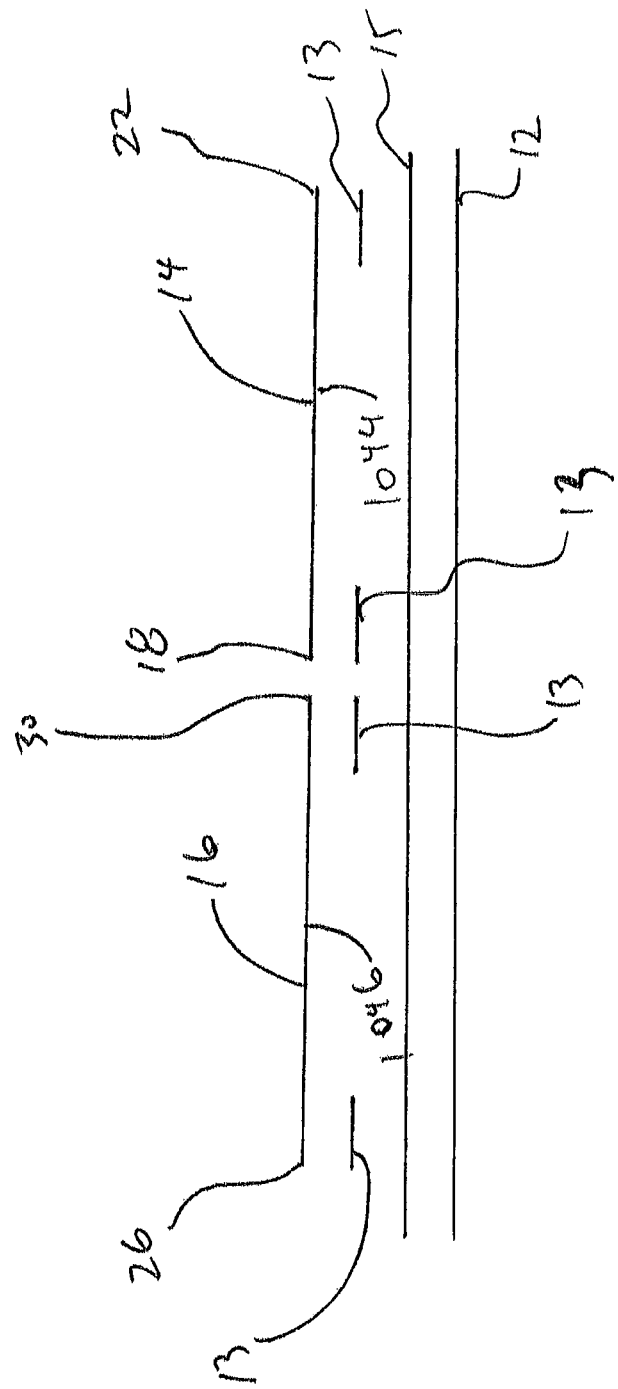

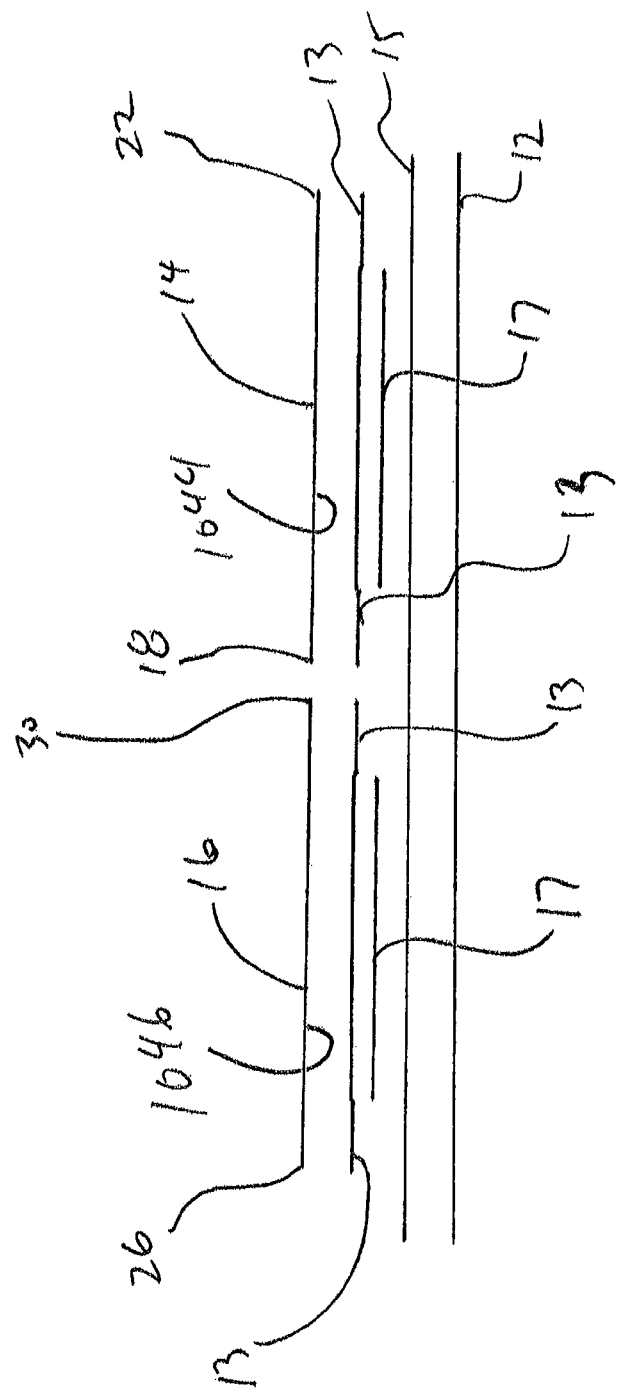

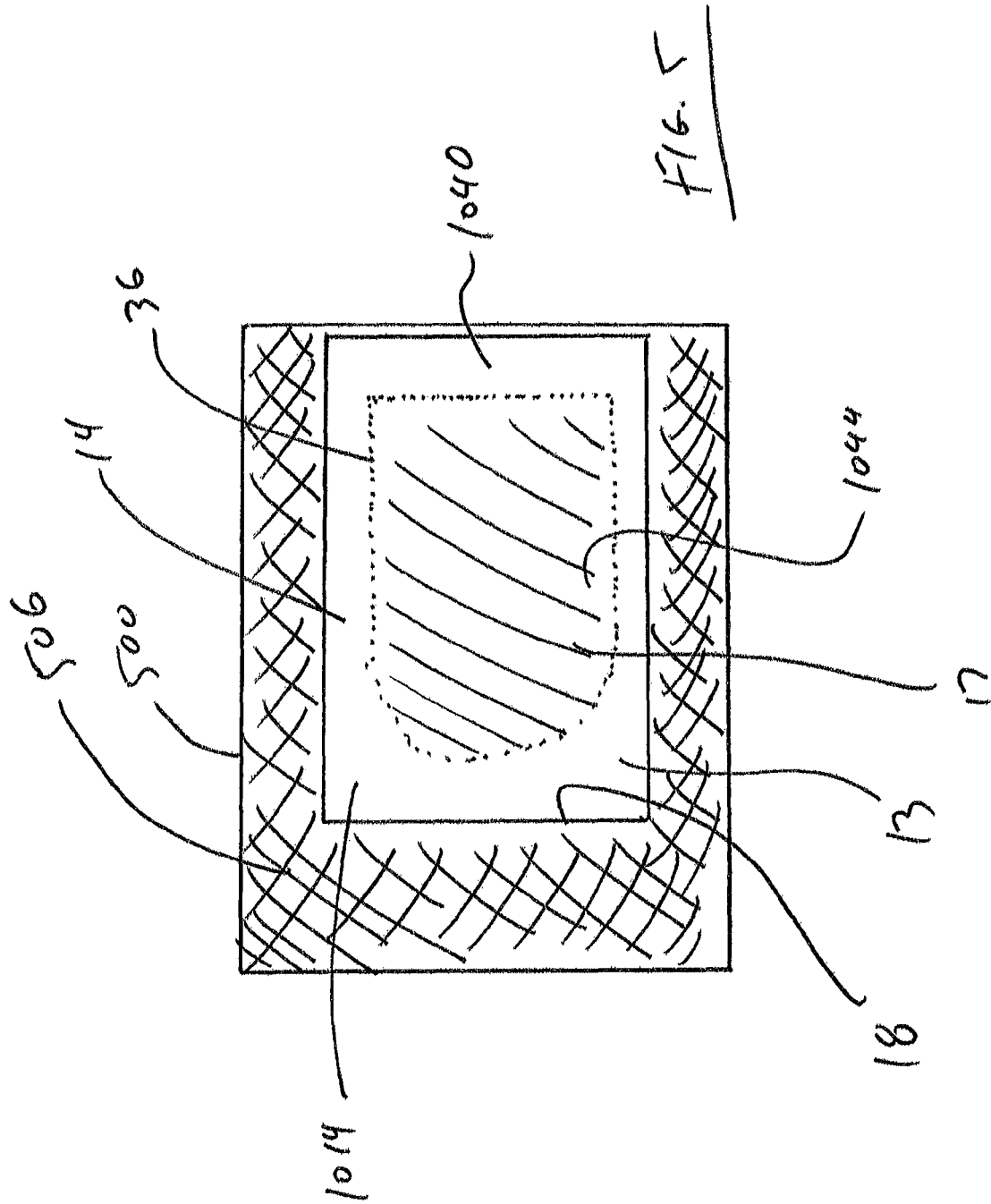

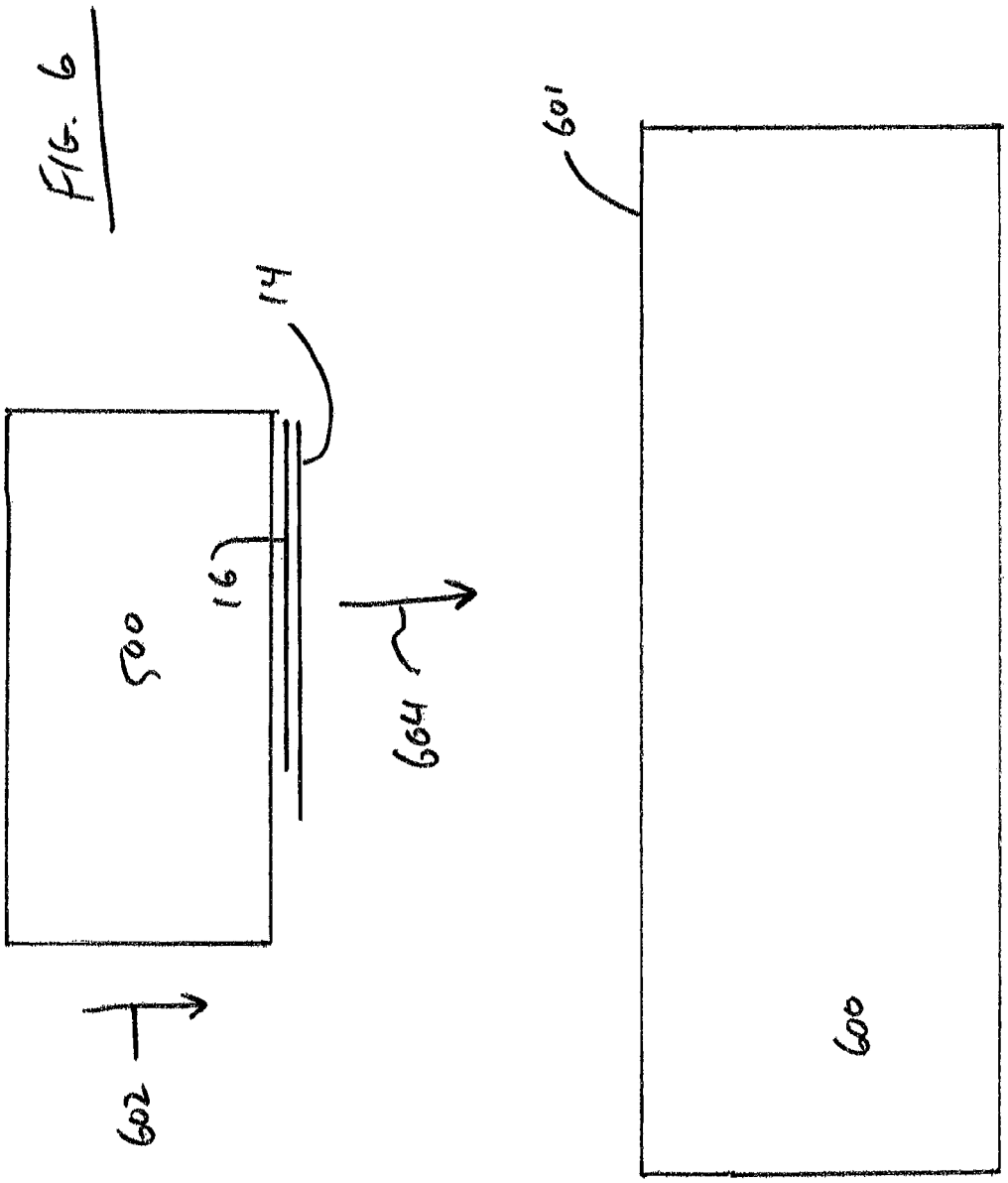

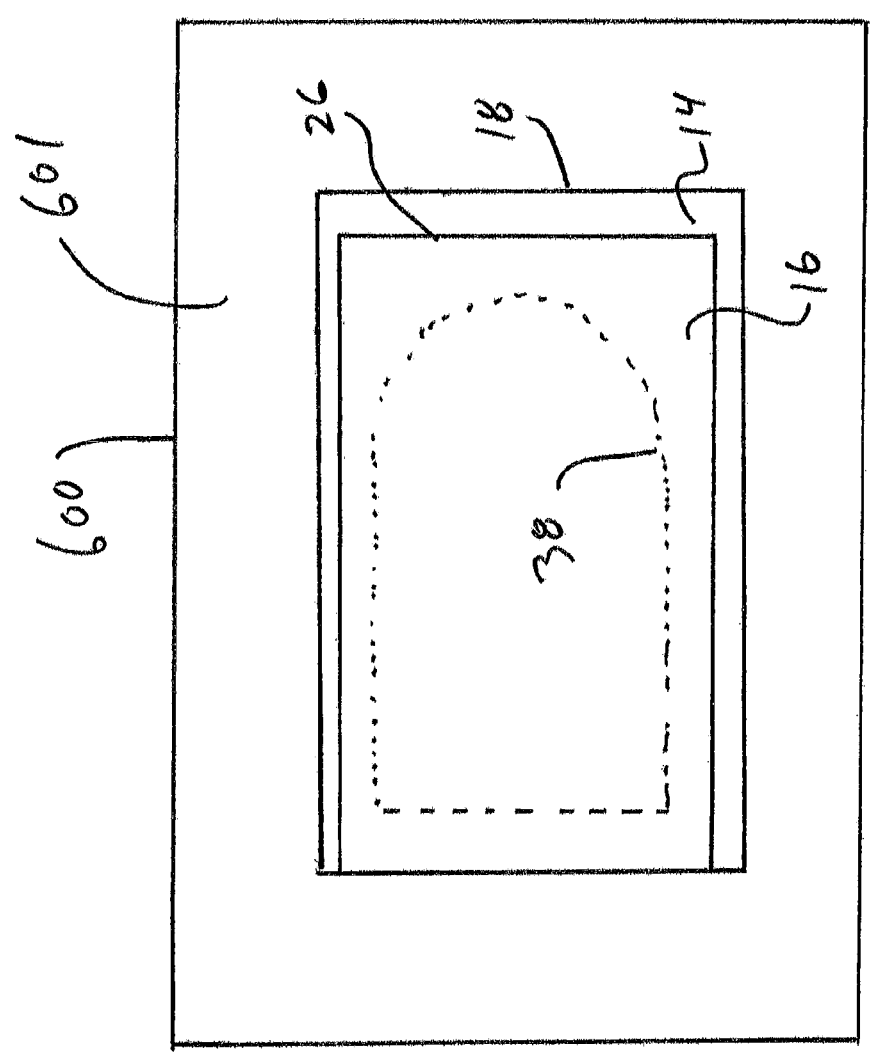

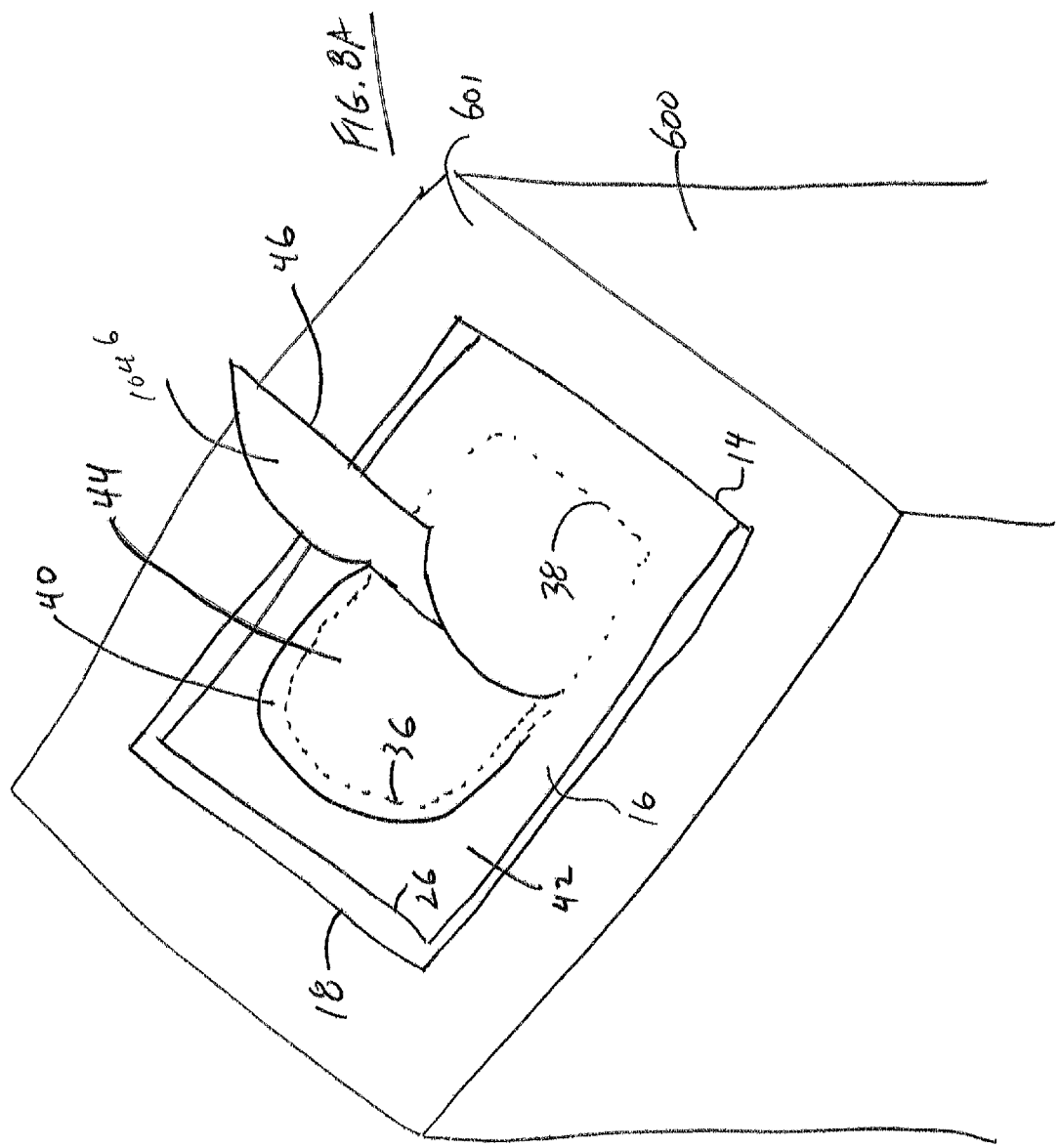

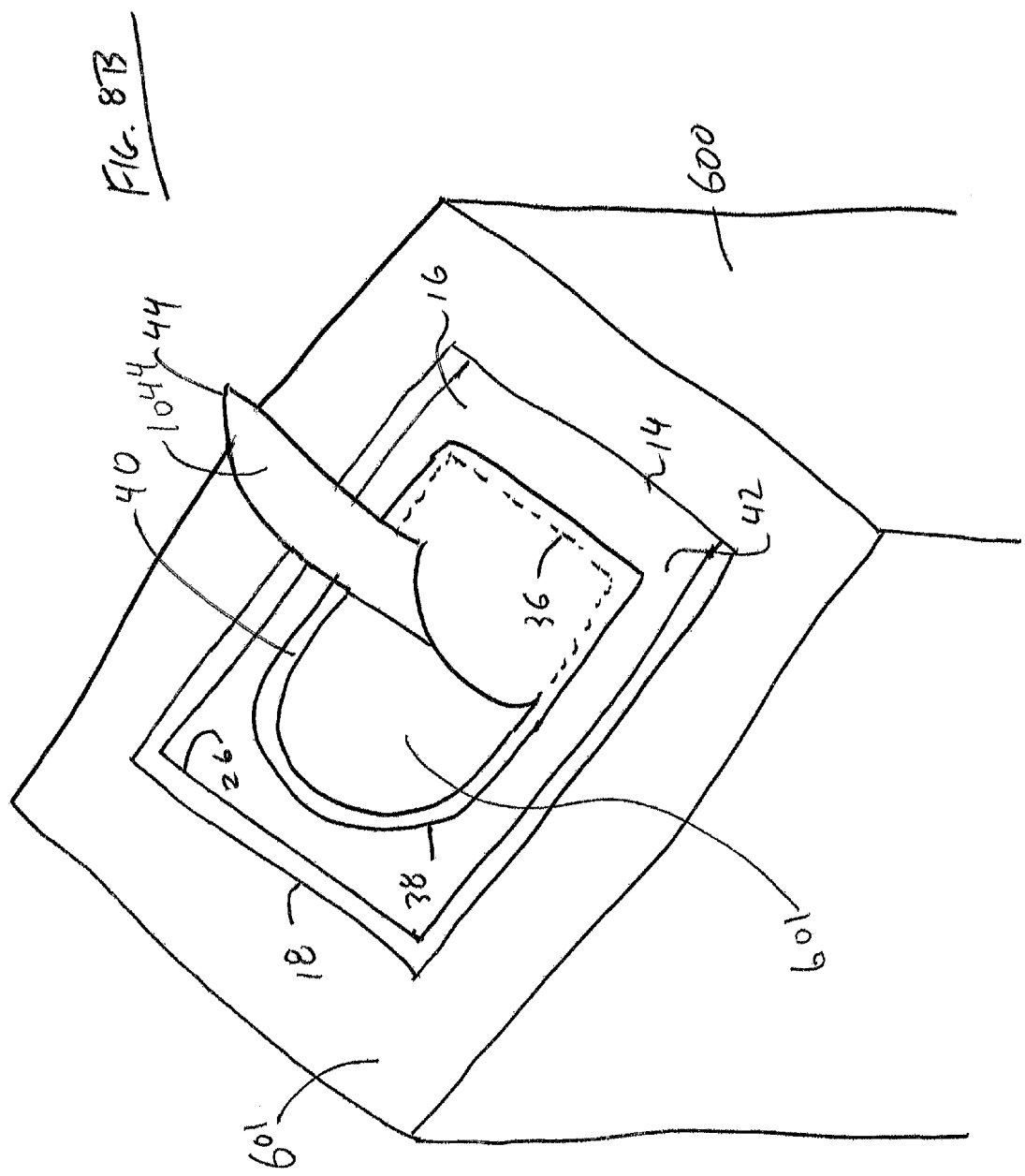

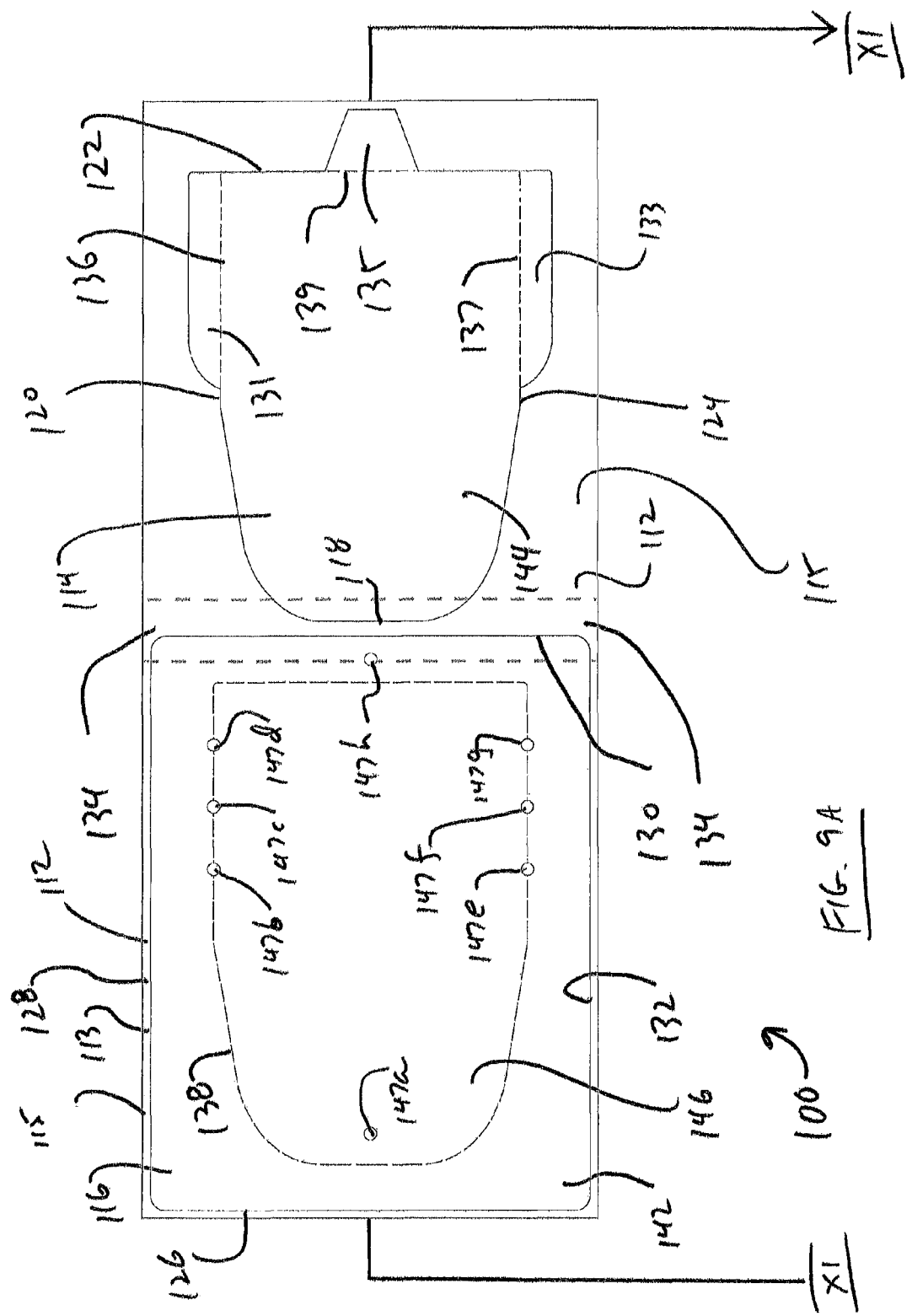

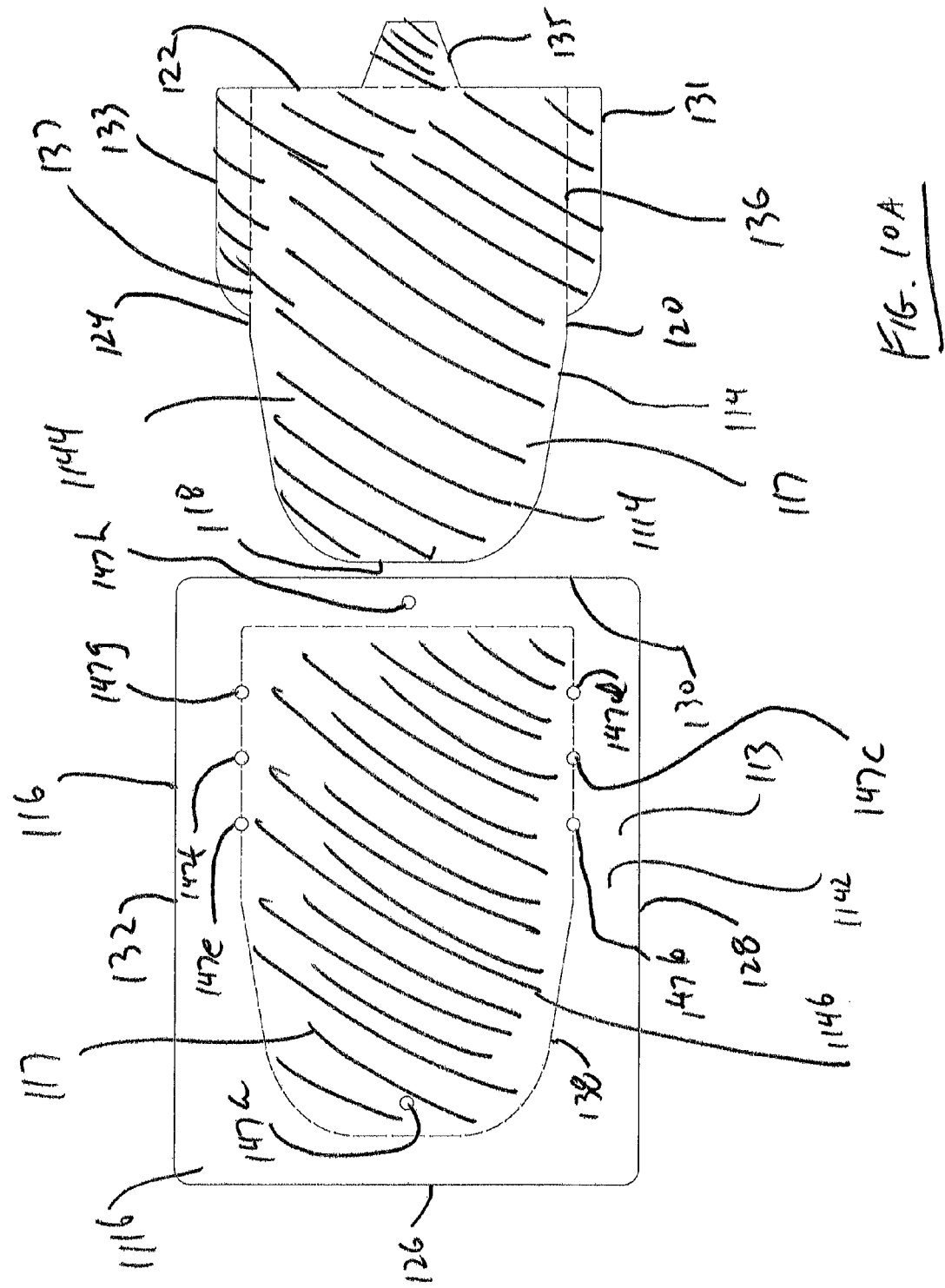

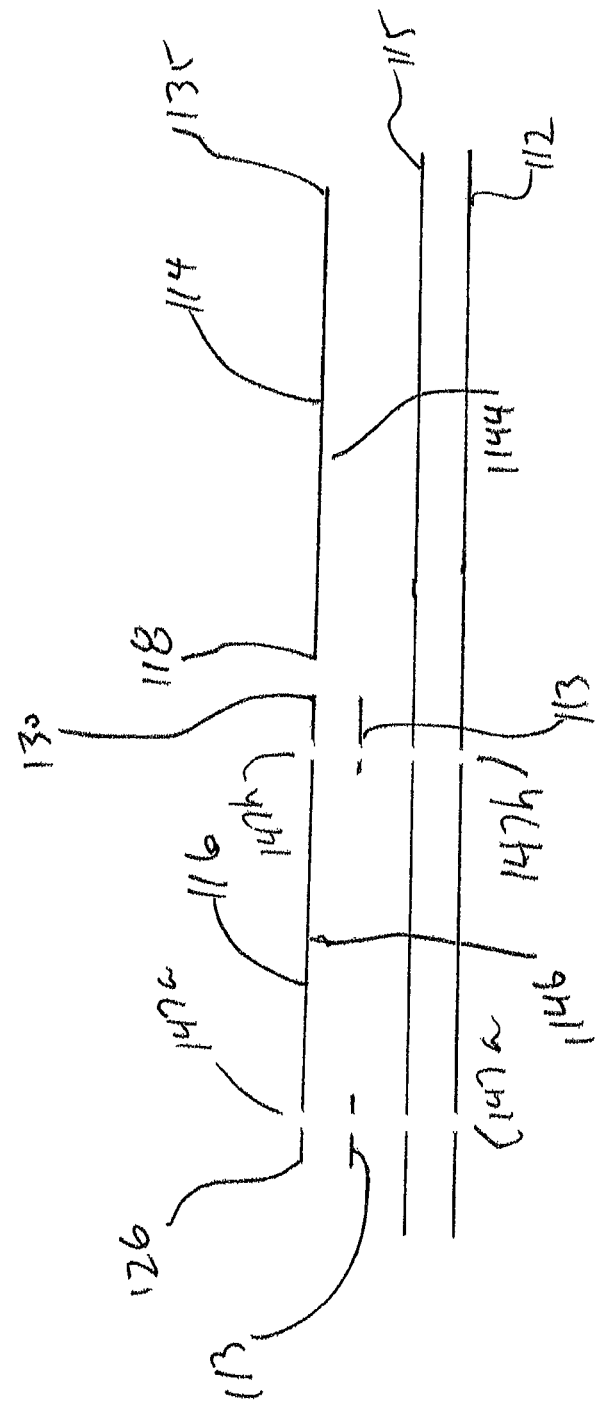

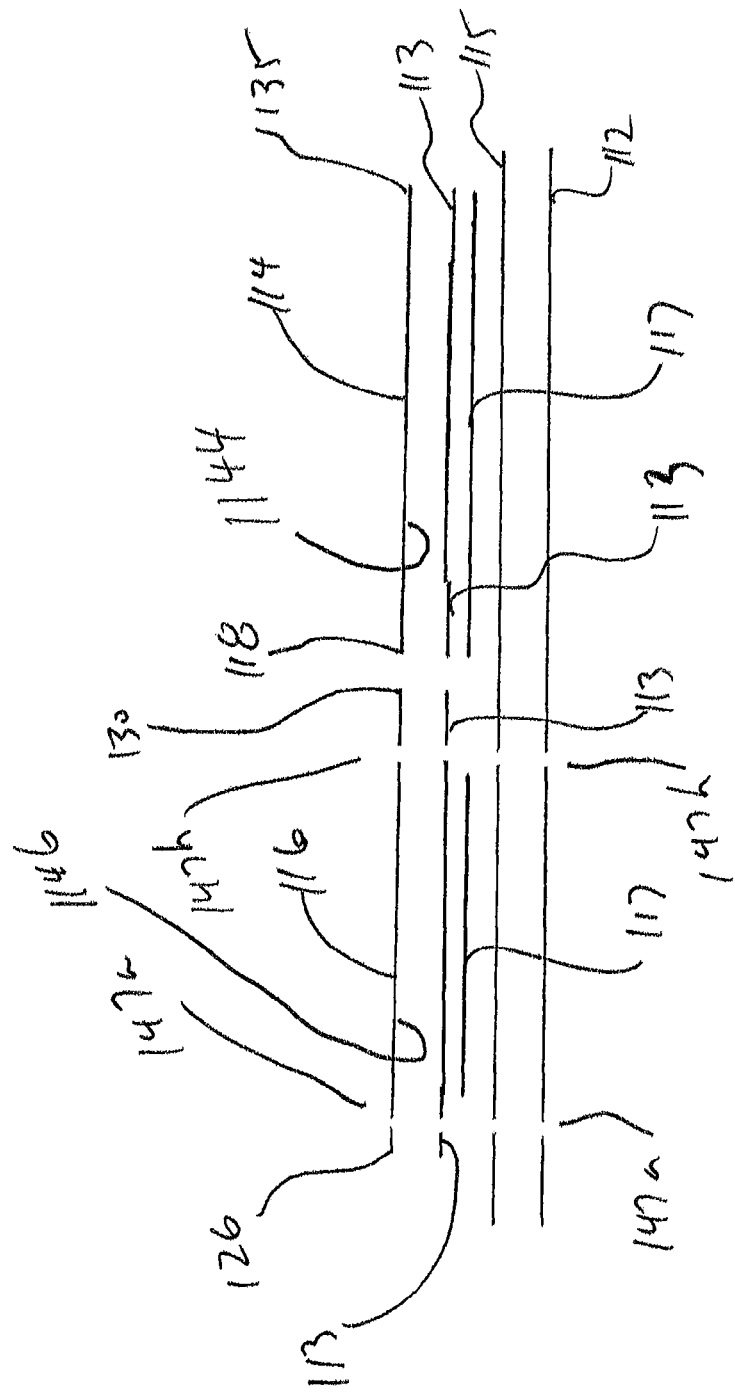

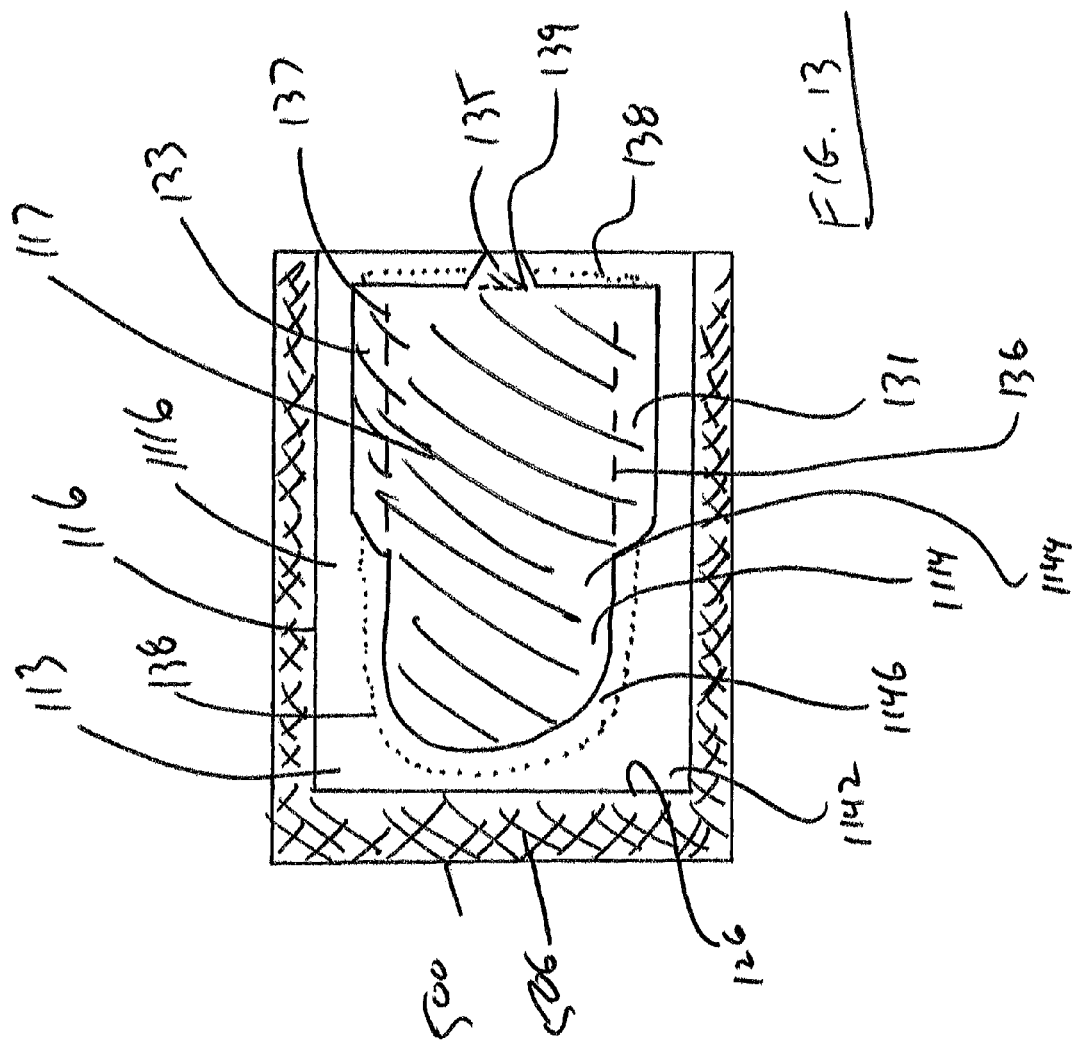

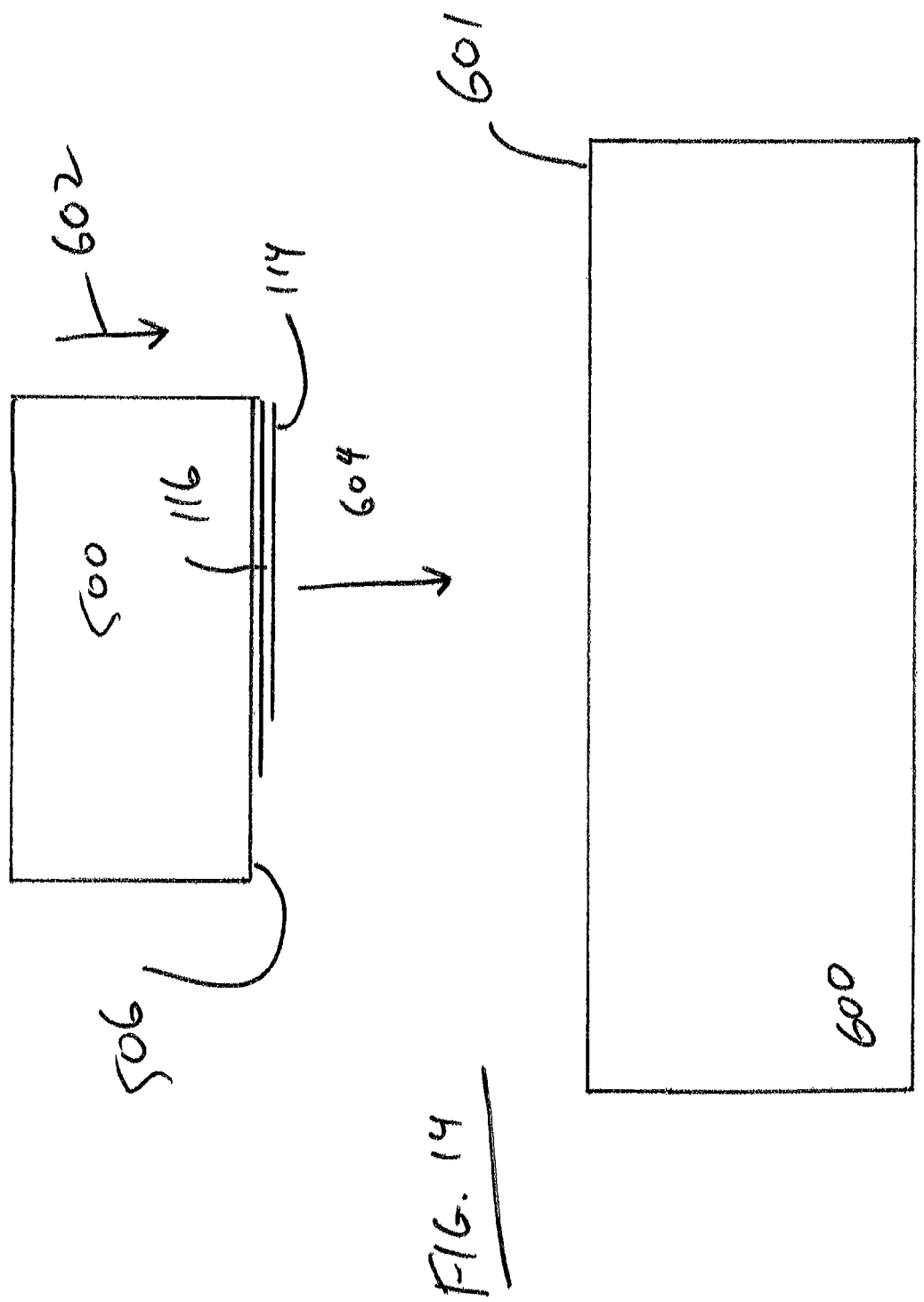

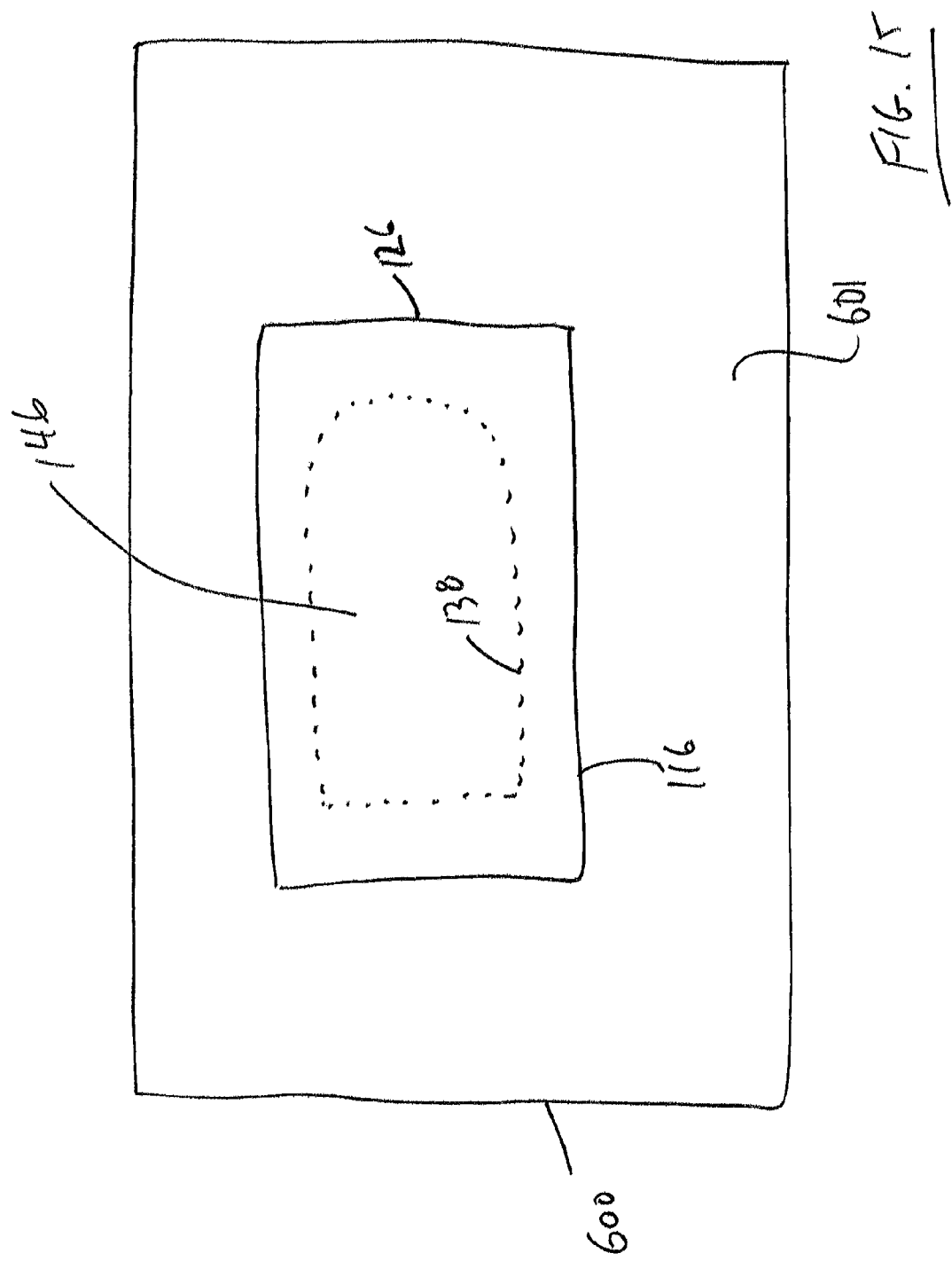

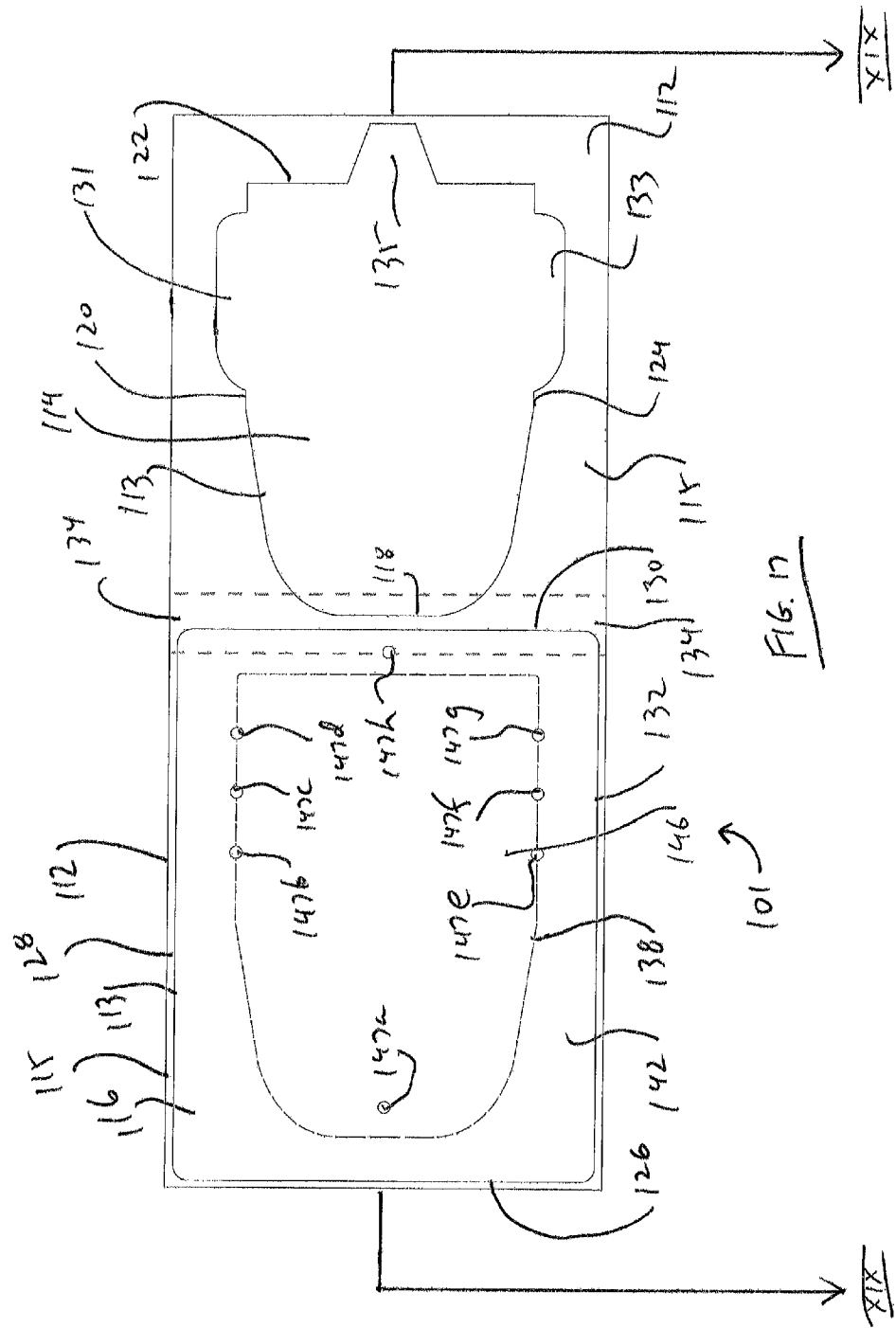

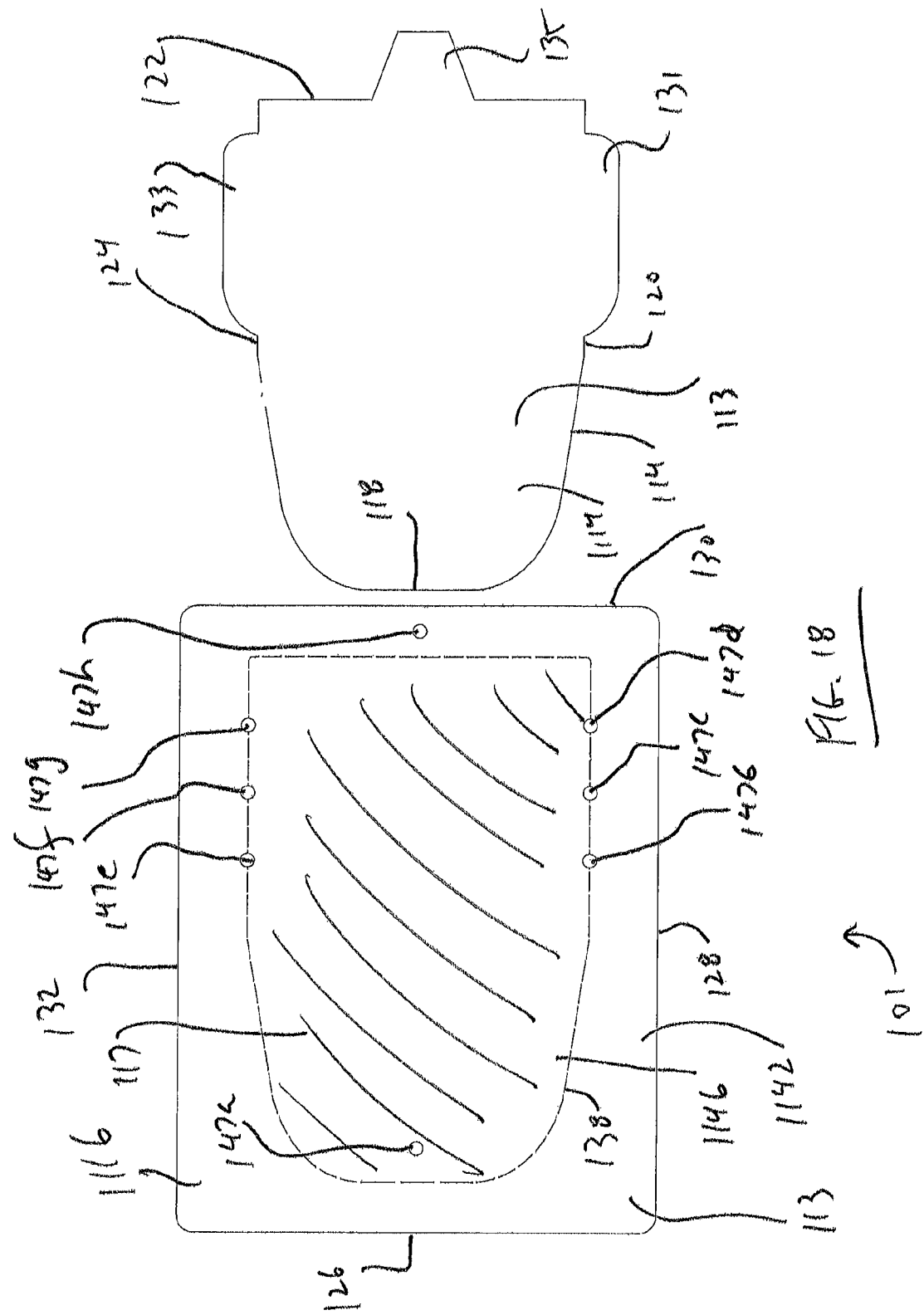

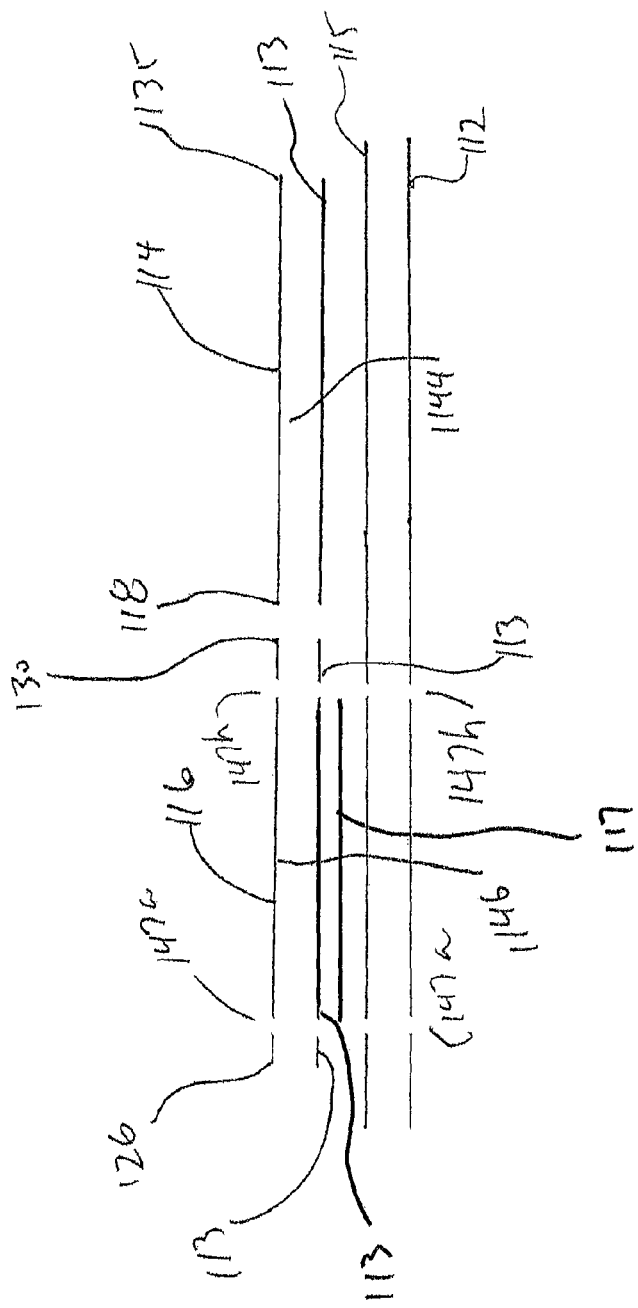

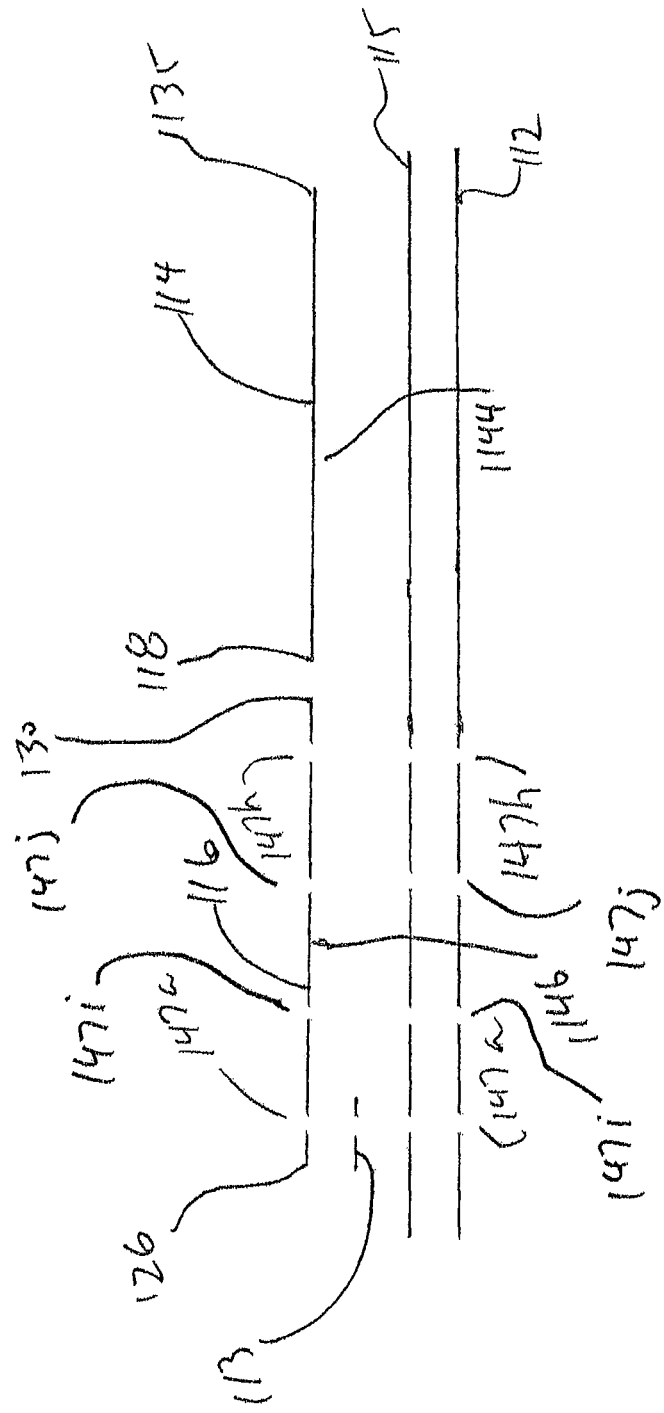

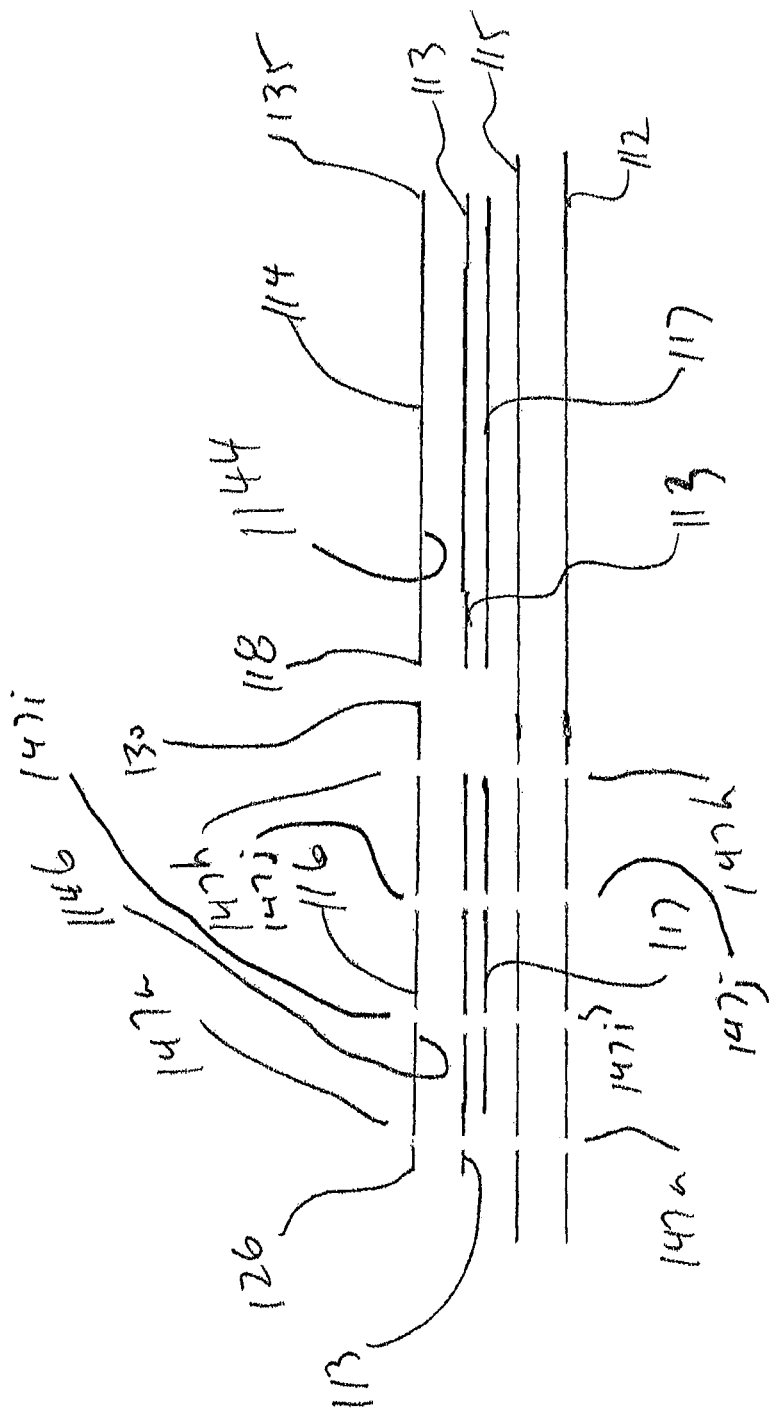

AUTO-APPLIED LABEL SYSTEMS

RELATED APPLICATIONS

This application is a continuation of U.S. application Ser. No. 12/965,139, filed Dec. 10, 2010, which is a continuation-in-part of U.S. application Ser. No. 12/951,232, filed Nov. 22, 2010, now U.S. Pat. No. 8,142,596. The disclosure of each of these applications is incorporated herein by reference.

BACKGROUND

Labels are commonly used to secure printed indicia to packages to indicate shipping or other information. In the instance of a shipping use, a separate packing list may be enclosed within a package shipped to the customer containing a purchased item.

There is significant demand for a labeling method that allows automatic printing and application of a lower label and an upper label to a surface. For example, there is significant demand for a labeling method that allows automatic printing and application of a packing list and shipping label to the surface of a sealed carton. Because the carton is sealed prior to packing list generation, it is not efficient to open it to insert a packing list. High volume shipping of such packages requires rapid attachment of a packing list and a shipping label to the package. It is preferred to conceal the information of the packing list until the final recipient receives the shipped package.

Complicated methods have been implemented for application of a lower label and an upper label to a surface. For example, where a packing list and shipping label are to be applied to the surface of a sealed carton, complicated methods have been implemented in which a packing list is applied and adhered as a pattern adhesive label atop a carton, using a first roll of labels (packing list labels) and a first label applicator. After the packing list label is applied, an address label is applied and adhered atop the packing list label, to conceal the packing list information, using a second roll of labels (address labels) and a second label applicator. Such methods have many shortcomings. For example, precise timing between the packing list application and the shipping label application is required to properly align the two labels, and to avoid mismatches between the packing list and the shipping label (e.g., where the packing list contains information about goods to be shipped to a first customer and the shipping label contains the address of a different customer. In addition, because two printers and two label applicators, along with related hardware and software, are required to apply a packing list and shipping label in sequence, such methods require significant floor space and investment.

For the foregoing reasons, it is desired to provide labeling methods that allows automatic printing and application of a lower label and an upper label to a surface while avoiding the many shortcomings of existing labeling methods. For the foregoing reasons, it is desired to provide labeling methods that allows automatic printing and application of a packing list label and shipping label to the surface of a sealed carton while avoiding the many shortcomings of existing labeling methods.

SUMMARY

The present disclosure includes disclosure of at least one system of labels for automatic application to a surface. In at least one embodiment, a label system according to the present disclosure comprises a carrier material, an upper label, and a lower label. An upper label of at least one such embodiment comprises a top surface and an opposing undersurface, the top surface and the undersurface having a leading edge and a trailing edge, and the undersurface in contact with the carrier material. A lower label of at least one such embodiment comprises a top side and an opposing underside, the top side and the underside having a leading margin and a trailing margin, and the underside being in contact with the carrier material. According to at least one such embodiment of the present disclosure, the upper label and the lower label are in contact with the carrier material in adjacent positions with the trailing edge adjacent to the leading margin, and the upper label and the lower label are configured for dispensing sequentially from the carrier material onto a label applicator apparatus such that when the upper label and the lower label are dispensed onto the label applicator apparatus the lower label is positioned against the undersurface of the upper label prior to attachment of the upper label and the lower label to an article.

In an aspect of at least one embodiment of the present disclosure, an upper label comprises a removable segment and a lower label comprises a removable region, and when the upper label and the lower label are dispensed onto a label applicator apparatus, the removable segment and the removable region are in registration.

In an aspect of at least one embodiment of the present disclosure, an undersurface comprises a zone with reduced adhesive properties and an underside comprises an area with reduced adhesive properties, and when an upper label and a lower label are dispensed onto a label applicator apparatus the zone with reduced adhesive properties and the area with reduced adhesive properties are in registration.

In an aspect of at least one embodiment of the present disclosure, the zone with reduced adhesive properties comprises an adhesive layer covered with an adhesive deadening agent.

In an aspect of at least one embodiment of the present disclosure, the area with reduced adhesive properties comprises an adhesive layer covered with an adhesive deadening agent.

In an aspect of at least one embodiment of the present disclosure, an upper label comprises one or more holes therethrough, and when the upper label and a lower label are dispensed onto a label applicator apparatus, the lower label is held in position against the undersurface of the upper label by a vacuum force generated by the label applicator apparatus, the vacuum force acting through the one or more holes.

In an aspect of at least one embodiment of the present disclosure, all of the underside comprises reduced adhesive properties.

In an aspect of at least one embodiment of the present disclosure, all of the underside comprises an adhesive layer covered with an adhesive deadening agent.

In an aspect of at least one embodiment of the present disclosure, the undersurface comprises pressure sensitive adhesive that removeably adheres the undersurface to the carrier material.

In at least one embodiment, a label system according to the present disclosure comprises a carrier material, an upper label, and a lower label. An upper label of at least one such embodiment is removeably adhered to the carrier material, and comprises a top surface, an undersurface, and a removable segment. An upper label of at least one such embodiment is bounded by a leading edge, a trailing edge, and first and second side edges. The undersurface of an upper label of at least one such embodiment comprises adhesive on at least a portion thereof and such an upper label is removeably adhered to the carrier material by the adhesive. A lower label of at least one such embodiment is removeably adhered to the carrier material in a position on the carrier material adjacent to the upper label and comprises a top side and an opposing underside. A lower label of at least one such embodiment is bounded by a leading margin, a trailing margin, and a first and second side margins. According to at least one such embodiment of the present disclosure, the upper label and the lower label are configured for dispensing sequentially from the carrier material onto a label applicator apparatus, such that when the upper label and the lower label are dispensed onto the label applicator apparatus the top surface is positioned against the label applicator apparatus, the top side of lower label is positioned against the undersurface of the upper label, and the underside is exposed.

In an aspect of at least one embodiment of the present disclosure, the top side of an upper label comprises a first surface area circumscribed by the leading margin, the trailing margin, and the first and second side margins, and the top surface of a lower label comprises a second surface area circumscribed by the leading edge, the trailing edge, and the first and second side edges, and the second surface area is not larger than the first surface area.

In at least one embodiment, a label system according to the present disclosure comprises a carrier material, a removable upper label on the carrier material, and a removable lower sheet on the carrier material in a position on the carrier material adjacent to the upper label. An upper label of at least one such embodiment comprises a top surface and an opposing undersurface, the undersurface facing the carrier material. A lower sheet of at least one such embodiment comprises a top side and an opposing underside, the underside facing the carrier material. According to at least one such embodiment of the present disclosure, wherein the upper label and the lower sheet are configured for dispensing sequentially from the carrier material onto a label applicator apparatus such that the top side of the lower sheet is positioned against the undersurface when the upper label and the lower sheet are dispensed onto the label applicator apparatus.

In an aspect of at least one embodiment of the present disclosure, an upper label comprises a removable segment, and a lower sheet comprises a removable region, and when the lower sheet is dispensed onto the label applicator apparatus, the removable segment and the removable region are in registration.

In an aspect of at least one embodiment of the present disclosure, the undersurface of an upper label comprises a zone with reduced adhesive properties, and the underside of a lower sheet comprises an area with reduced adhesive properties, and when the lower sheet is dispensed onto the label applicator apparatus, the zone with reduced adhesive properties and the area with reduced adhesive properties are in registration.

In an aspect of at least one embodiment of the present disclosure, the zone with reduced adhesive properties comprises an adhesive layer covered with an adhesive deadening agent.

In an aspect of at least one embodiment of the present disclosure, the area with reduced adhesive properties comprises an adhesive layer covered with an adhesive deadening agent.

In an aspect of at least one embodiment of the present disclosure, an upper label comprises one or more holes therethrough, and a lower sheet is held in position against the undersurface of the upper label by the vacuum force generated by a label applicator apparatus, the vacuum force acting through the one or more holes.

In an aspect of at least one embodiment of the present disclosure, a lower sheet is held in position against the undersurface of the upper label by a vacuum force generated by a label applicator apparatus.

In an aspect of at least one embodiment of the present disclosure, all of the underside of a lower sheet comprises reduced adhesive properties.

In an aspect of at least one embodiment of the present disclosure, all of the underside of a lower sheet comprises an adhesive layer covered with an adhesive deadening agent.

In an aspect of at least one embodiment of the present disclosure, the undersurface of an upper label comprises adhesive, and when a lower sheet is dispensed onto the label applicator apparatus the adhesive on the undersurface adhesively interacts with the top side of the lower sheet.

BRIEF DESCRIPTION OF THE DRAWINGS

The features and advantages of this disclosure, and the manner of attaining them, will be more apparent and better understood by reference to the following descriptions of the disclosed methods and systems, taken in conjunction with the accompanying drawings, wherein:

FIG. 3A shows a cross-sectional view of an auto-applied upper and lower label system according to at least one embodiment of the present disclosure.

FIG. 3B shows a cross-sectional view of an auto-applied upper and lower label system according to at least one embodiment of the present disclosure.

FIGS. 4A-B show side views of an auto-applied upper and lower label system according to at least one embodiment of the present disclosure.

FIG. 5 shows the underside of a label applicator after an upper label and a lower label according to at least one embodiment of the present disclosure have been dispensed thereon.

FIG. 6 shows a side view of the application of an upper label and a lower label according to at least one embodiment of the present disclosure to a surface of a container.

FIG. 7 shows an upper label and a lower label according to at least one embodiment of the present disclosure adhered to a surface of a container.

FIGS. 8A-B show an embodiment of an auto-applied upper and lower label system according to at least one embodiment of the present disclosure.

FIG. 9A shows an auto-applied upper and lower label system according to at least one embodiment of the present disclosure.

FIG. 10A shows the underside of a lower label and the undersurface of an upper label according to at least one embodiment of the present disclosure.

FIG. 11A shows a cross-sectional view of an auto-applied upper and lower label system according to at least one embodiment of the present disclosure.

FIG. 11B shows a cross-sectional view of an auto-applied upper and lower label system according to at least one embodiment of the present disclosure.

FIG. 13 shows the underside of a label applicator after an upper label and a lower label according to at least one embodiment of the present disclosure have been dispensed thereon.

FIG. 14 shows a side view of the application of an upper label and a lower label according to at least one embodiment of the present disclosure to a surface of a container.

FIG. 15 shows an upper label and a lower label according to at least one embodiment of the present disclosure adhered to a surface of a container.

FIG. 17 shows an auto-applied upper and lower label system according to at least one embodiment of the present disclosure.

FIG. 18 shows the underside of a lower label and the undersurface of an upper label according to at least one embodiment of the present disclosure.

FIG. 19B shows a cross-sectional view of an auto-applied upper and lower label system according to at least one embodiment of the present disclosure.

FIG. 22A shows a cross-sectional view of an auto-applied upper and lower label system according to at least one embodiment of the present disclosure.

FIG. 22B shows a cross-sectional view of an auto-applied upper and lower label system according to at least one embodiment of the present disclosure.

DESCRIPTION

Figure 1:
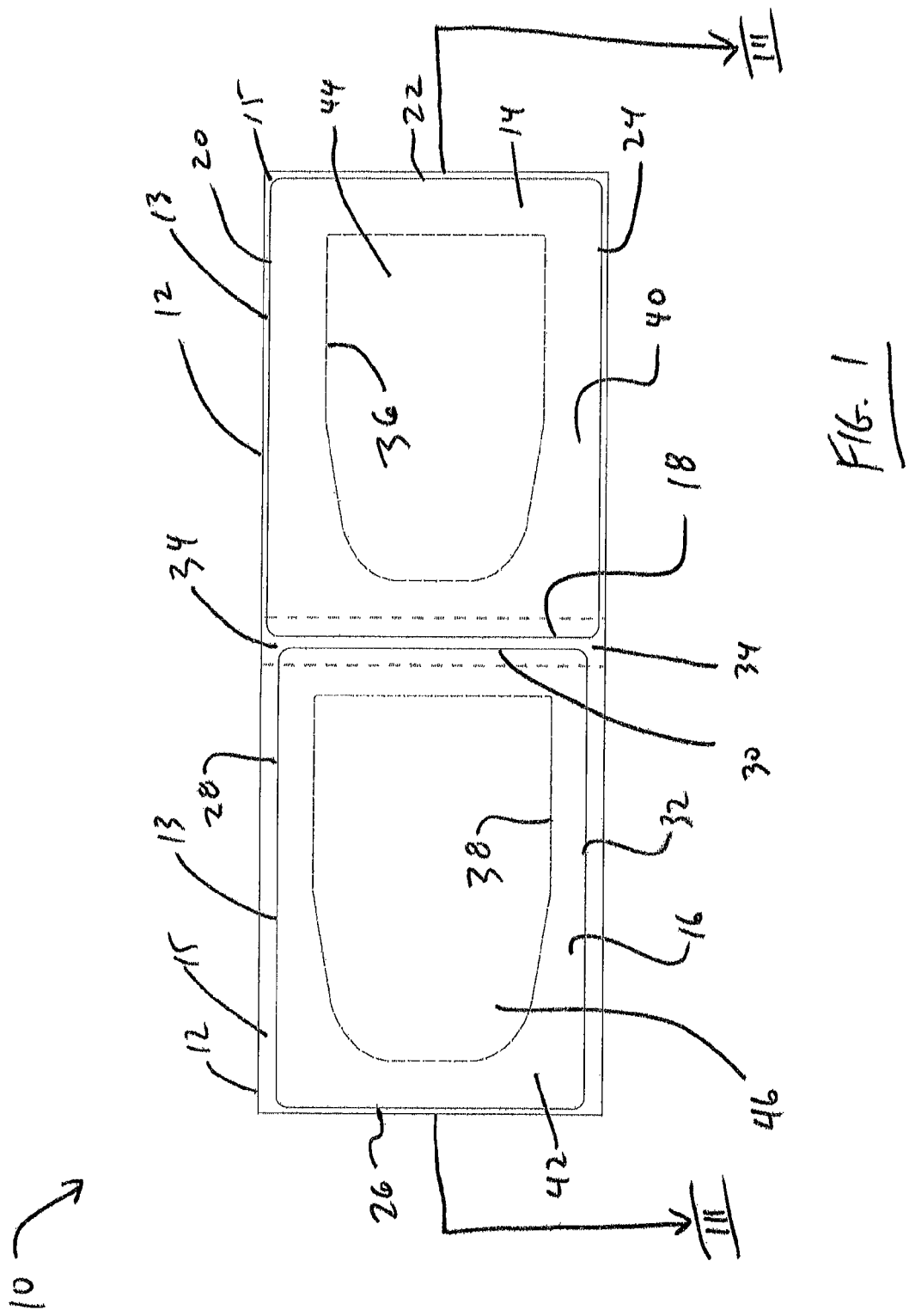
FIG. 1 shows an auto-applied upper and lower label system according to at least one embodiment of the present disclosure.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended, FIG. 1 shows an auto-applied upper and lower label system 10 according to at least one embodiment of the present disclosure. Shown in FIG. 1 are auto-applied lower label 14 and auto-applied upper label 16. In at least one embodiment of an auto-applied upper and lower label system according to the present disclosure, a plurality of lower labels 14 and upper labels 16 reside alternately on carrier 12. In at least one embodiment of an auto-applied upper and lower label system 10 according to the present disclosure, each lower label 14 comprises a packing list label, and each upper label 16 comprises a shipping label.

According to at least one embodiment of an auto-applied upper and lower label system according to the present disclosure, lower label 14 is bounded by leading edge 18, trailing edge 22, and side edges 20 and 24. One or more lines of weakness 36 define a boundary of removable region 44. In at least one embodiment of the present disclosure where lower label 14 comprises a packing list label, removable region 44 comprises a removable packing list. Frame 40 exists between a line of weakness 36 and leading edge 18, trailing edge 22, and side edges 20 and 24.

According to at least one embodiment of an auto-applied upper and lower label system according to the present disclosure, upper label 16 is bounded by leading edge 26, trailing edge 30, and side edges 28 and 32. One or more lines of weakness 38 define a boundary of removable segment 46. Frame 42 lies between line of weakness 38 and leading edge 26, trailing edge 30, and side edges 28 and 32.

According to at least one embodiment of an auto-applied upper and lower label system according to the present disclosure, the area of lower label 14 bounded by leading edge 18, trailing edge 22, and side edges 20 and 24 is greater than the area of upper label 16 bounded by leading edge 26, trailing edge 30, and side edges 28 and 32. According to at least one embodiment of an auto-applied upper and lower label system according to the present disclosure, the area of removable region 44 is no larger than the area of removable segment 46.

According to at least one embodiment of an auto-applied upper and lower label system according to the present disclosure, upper label 16 and lower label 14 are deployed adjacent to each other on carrier 12 and removeably adhered to carrier 12, thereby enabling upper label 16 and lower label 14 to be dispensed from carrier 12 in sequence as discussed herein. Carrier 12 comprises, in at least one embodiment, release coating 15 on the surface of carrier 12 facing the undersides of lower label 14 and upper label 16. In at least one embodiment of the present disclosure, release coating 15 is a silicone release coating. According to at least one embodiment of label system 10 according to the present disclosure, adhesive 13 is interposed between release coat 15 and the undersides of lower label 14 and upper label 16, as discussed hereinafter. In at least one embodiment of the present disclosure, adhesive 13 is a pressure sensitive adhesive.

In at least one embodiment of an auto-applied upper and lower label system according to the present disclosure, carrier 12 comprises transverse stripe 34. Transverse stripe 34 comprises a color or shading of a region of carrier 12 that is different from the color of the remainder of carrier 12. In at least one embodiment, a transverse stripe 34 is located after each upper label 16 and before the adjacent lower label 14. In at least one embodiment, a transverse stripe 34 overlaps the trailing edge 30 of each upper label 16 and the leading edge 18 of each lower label 14.

In at least one embodiment of an auto-applied upper and lower label system according to the present disclosure, one or more transverse stripes 34 are used in conjunction with a detection apparatus for purposes of synchronizing the dispensing of the upper label 16 and the adjacent lower label 14.

Figure 2:
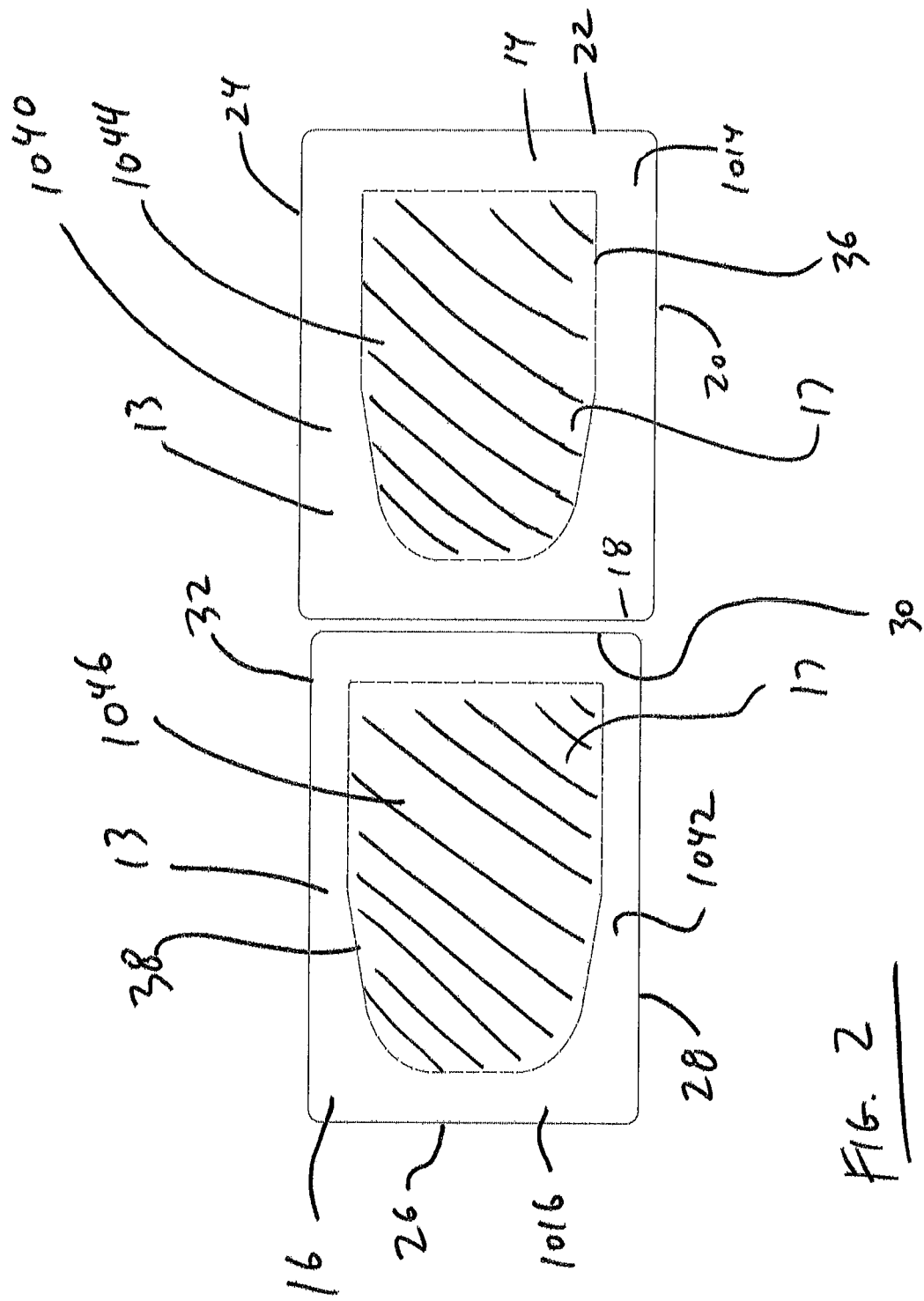
FIG. 2 shows the underside of a lower label and the undersurface of an upper label according to at least one embodiment of the present disclosure.

FIG. 2 shows the underside of lower label 14 and the undersurface of upper label 16 according to at least one embodiment of an auto-applied upper and lower label system according to the present disclosure, with carrier 12 not visible for purposes of clarity. Shown in FIG. 2 is underside 1014 of lower label 14, which is bounded by leading edge 18, trailing edge 22, and side edges 20 and 24. Also shown in FIG. 2 is undersurface 1016 of upper label 16, which is bounded by leading edge 26, trailing edge 30, and side edges 28 and 32.

In at least one embodiment, underside 1014 of lower label 14 comprises a first portion 1040 and a second portion 1044, separated by a line of weakness 36. First portion 1040 comprise the underside of frame 40. Second portion 1044 comprises the underside of removable region 44. In at least one embodiment, first portion 1040 comprises adhesive 13 on all or substantially all of its surface area. In at least one embodiment, second portion 1044 is free of or substantially free of adhesive. In at least one embodiment, second portion 1044 comprises adhesive 13 on all or substantially all of its surface area, but an adhesive deadening agent 17 such as, for example, a non-adhesive varnish, covers adhesive 13 in those areas thereby rendering adhesive 13 ineffective in those areas. In at least one embodiment of the present disclosure, adhesive deadening agent 17 is selected so as to not render adhesive 13 completely ineffective in those areas treated by adhesive deadening agent 17. In such an embodiment, after treatment of adhesive 13 with adhesive deadening agent 17, the treated areas retain a slight tackiness.

In at least one embodiment of the present disclosure, undersurface 1016 of upper label 16 comprises a first portion 1042 and a second portion 1046, separated by a line of weakness 38. First portion 1042 comprises the undersurface of frame 42. Second portion 1046 comprises the undersurface of removable segment 46. In at least one embodiment, first portion 1042 comprises adhesive 13 on all or substantially all of its surface area. In at least one embodiment, second portion 1046 is free of or substantially free of adhesive. In at least one embodiment, second portion 1046 comprises adhesive 13 on all or substantially all of its surface area, but an adhesive deadening agent 17 thereby such as, for example, a non-adhesive varnish, covers adhesive 13 in those areas rendering adhesive 13 ineffective in those areas. In at least one embodiment of the present disclosure, adhesive deadening agent 17 is selected so as to not render adhesive 13 completely ineffective in those areas treated by adhesive deadening agent 17. In such an embodiment, after treatment of adhesive 13 with adhesive deadening agent 17, the treated areas retain a slight tackiness.

FIG. 3A shows a cross-sectional view of an auto-applied upper and lower label system according to at least one embodiment of the present disclosure taken on line III-III of FIG. 1. The auto-applied upper and lower label system is shown in FIG. 3A in a semi-exploded state for purposes of clarity. Shown in FIG. 3A are carrier 12, adhesive 13, lower label 14 comprising leading edge 18 and trailing edge 22, release coating 15, and upper label 16 comprising leading edge 26 and trailing edge 30. As shown in this embodiment of an auto-applied upper and lower label system according to the present disclosure, second portion 1044 and second portion 1046 are free of adhesive 13.

FIG. 3B shows a cross-sectional view of an auto-applied upper and lower label system according to at least one embodiment of the present disclosure taken on line III-III of FIG. 1. The auto-applied upper and lower label system is shown in FIG. 3B in a semi-exploded state for purposes of clarity. Shown in FIG. 3B are carrier 12, adhesive 13, lower label 14 comprising leading edge 18 and trailing edge 22, release coating 15, upper label 16 comprising leading edge 26 and trailing edge 30, and adhesive deadening agent 17. As shown in this embodiment of an auto-applied upper and lower label system according to the present disclosure, second portion 1044 comprises adhesive 13 on all or substantially all of its surface area, but adhesive deadening agent 17 such as, for example, a non-adhesive varnish, covers adhesive 13 in those areas. Second portion 1046 also comprises adhesive 13 on all or substantially all of its surface area, but adhesive deadening agent 17 such as, for example, a non-adhesive varnish, covers adhesive 13 in those areas.

Figure 4A:
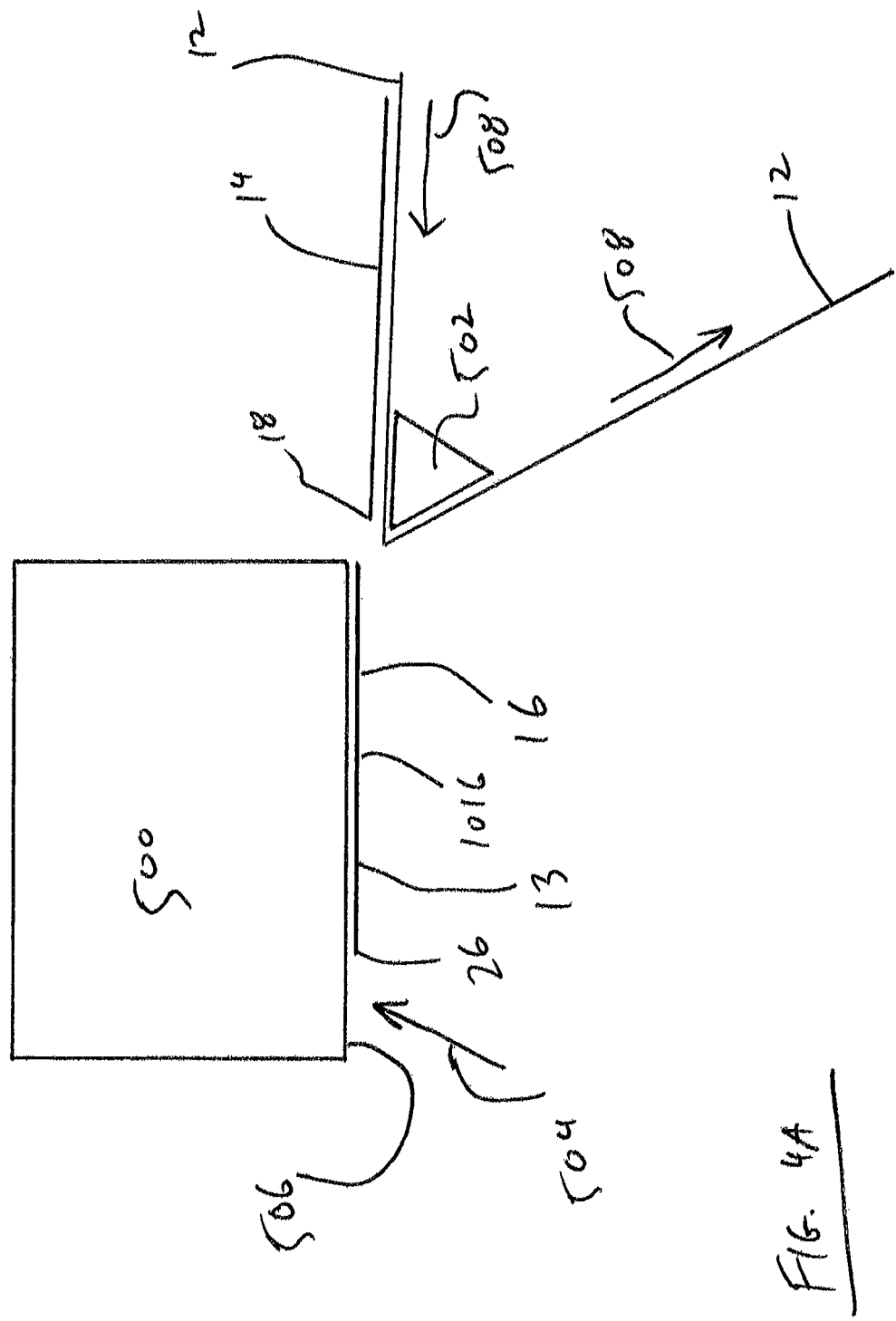
Figure 43:
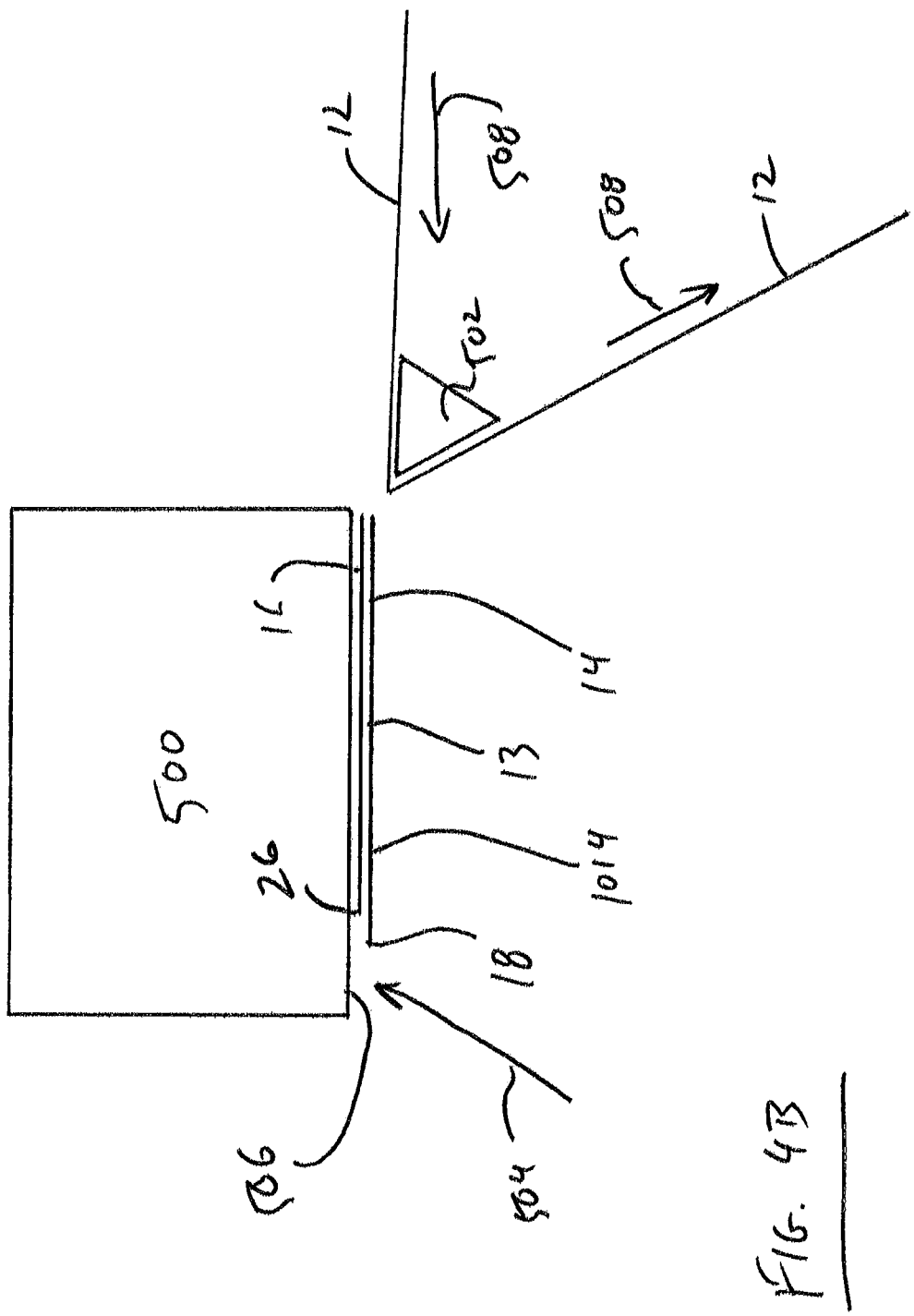

FIGS. 4A-B show side views of an auto-applied upper and lower label system according to at least one embodiment of the present disclosure while in use. As shown in FIG. 4A, carrier 12 with upper label 16 and lower label 14 thereon is advanced in direction 508. Carrier 12 is routed around member 502, causing upper label 16 to be dispensed from carrier 12 beginning with leading edge 26. At least a portion of undersurface 1016 of upper label 16 comprises adhesive 13 after it is dispensed from carrier 12. As upper label 16 is dispensed from carrier 12, upper label 16 passes under label applicator 500. Force 504 generated by label applicator 500 causes upper label 16 to be lifted and held against screen 506. Screen 506 forms a lower surface of label applicator 500. In at least one embodiment of the present disclosure, force 504 is a vacuum force. In at least one embodiment of the present disclosure, force 504 is an electrostatic force.

Turning now to FIG. 4B, after upper label 16 is dispensed from carrier 12, carrier 12 with lower label 14 thereon is advanced in direction 508. Carrier 12 is routed around member 502, causing lower label 14 to be dispensed from carrier 12 beginning with leading edge 18. At least a portion of underside 1014 of lower label 14 comprises adhesive 13 after it is dispensed from carrier 12. As lower label 14 is dispensed from carrier 12, lower label 14 passes under label applicator 500. Force 504 generated by label applicator 500 causes lower label 14 to be lifted and held against, and in registration with, upper label 16. Because in such an embodiment of an auto-applied upper and lower label system according to the present disclosure the area of lower label 14 is greater than the area of upper label 16, force 504 acts on the edges of lower label 14 to hold lower label 14 against screen 506. Undersurface 1016 begins to be adhered to lower label 14 by adhesive 13.

In at least one embodiment of an auto-applied upper and lower label system according to the present disclosure, prior to the time upper label 16 is dispensed from carrier 12, indicia is printed on or applied to upper label 16. In an embodiment of applied upper and lower label system according to the present disclosure where upper label 16 is a shipping label, indicia, such as, for example, destination address and/or other relevant shipping indicia, may be printed on or applied to upper label 16.

In at least one embodiment of an auto-applied upper and lower label system according to the present disclosure, prior to the time lower label 14 is dispensed from carrier 12, indicia is printed on or applied to lower label 14. In an embodiment of applied upper and lower label system according to the present disclosure where lower label 14 is a packing list label, indicia, such as, for example, container contents and/or other packing list indicia, may be printed on or applied to lower label 14.

In at least one embodiment, label applicator 500 comprises a printing capability such as, for example, a thermal transfer printer or a direct thermal printer. In such an embodiment, indicia may be applied to upper label 16 and/or lower label 14 by label applicator 500.

FIG. 5 shows the underside of label applicator 500 after upper label 16 and lower label 14 have been dispensed thereon, according to at least one embodiment of an auto-applied upper and lower label system according to the present disclosure. Visible in FIG. 5 is screen 506. As shown in FIG. 5, underside 1014 of lower label 14 is visible. From the point of view shown in FIG. 5, lower label 14 fully obscures upper label 16, although upper label 16 is in registration with lower label 14, between lower label 14 and screen 506. Adhesive 13 is present in an effective amount in first portion 1040. Second portion 1044 comprises no more than very limited adhesive properties.

FIG. 6 shows a side view of the application of upper label 16 and lower label 14 to surface 601 of container 600, according to at least one embodiment of the present disclosure. As shown in FIG. 6, label applicator 500 moves in direction 602, thereby moving upper label 16 and lower label 14 in direction 604 until the underside 1014 of lower label 14 is in contact with surface 601 of container 600. The pressure of label applicator 500 against surface 601 of container 600 causes adhesive 13 to adhere the underside 1014 of lower label 14 to surface 601 of container 600, and completes the adhesion of undersurface 1016 to lower label 14.

FIG. 7 shows lower label 14 and upper label 16 adhered to surface 601 of container 600, according to at least one embodiment of the present disclosure. As shown in FIG. 7, lower label 14 and upper label 16 are in registration. A line of weakness 38 is visible on upper label 16.

FIGS. 8A-B show an embodiment of an auto-applied upper and lower label system according to the present disclosure. As shown in FIG. 8A, removable segment 46 of upper label 16 is partially removed from upper label 16 along a line of weakness 38. Removing segment 46 in this fashion reveals removable region 44 of lower label 14. In an embodiment of applied upper and lower label system according to the present disclosure where lower label 14 is a packing list label, removable region 44 may comprise a removable packing list. Because in such an embodiment of the present disclosure underside 1046 has no more than very limited adhesive properties, removable region 44 is not damaged or defaced by removing segment 46. As segment 46 is removed, frame 42 of upper label 16 remains adhered to lower label 14.

Figure 9B:
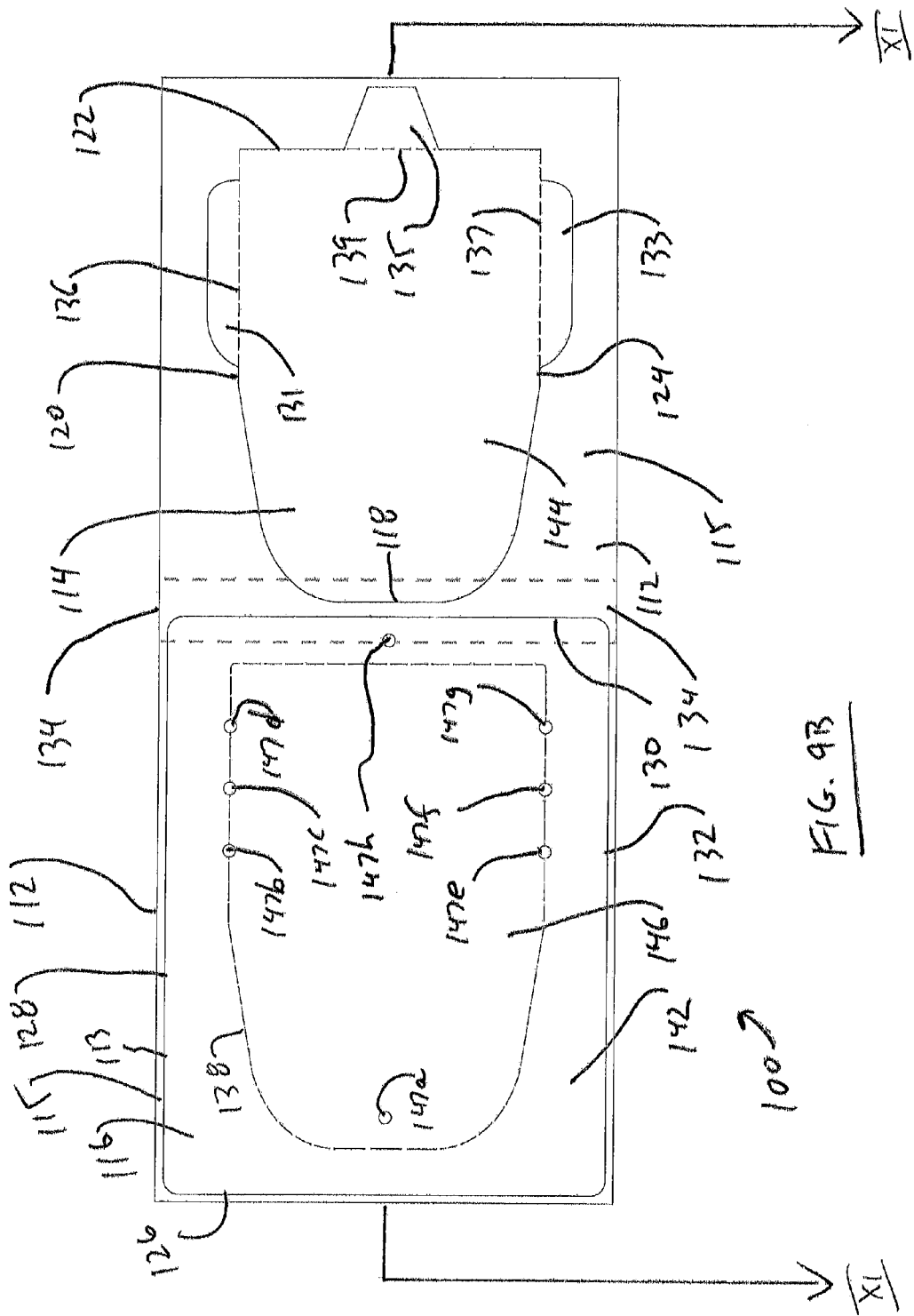
FIG. 9B shows an auto-applied upper and lower label system according to at least one embodiment of the present disclosure.

As shown in FIG. 8B, removable segment 46 of upper label 16 is fully removed from upper label 16 along a line of weakness 38. Removable region 44 may be removed from lower label 14 along a line of weakness 36. In an embodiment of applied upper and lower label system according to the present disclosure where lower label 14 is a packing list label, removable region 44 may comprise a removable packing list. Because in such an embodiment of the present disclosure underside 1044 has no more than very limited adhesive properties, removable region 44 is readily removable from surface 601 of container 600. After removable region 44 is removed, frame 42 of upper label 16 remains adhered to frame 40 of lower label 14, and frame 40 of lower label 14 remains adhered to surface 601 of container 600, FIGS. 9A-B shows auto-applied upper and lower label system 100 according to at least one embodiment of the present disclosure. Shown in FIGS. 9A-B are auto-applied lower label 114 and auto-applied upper label 116. In at least one embodiment of the present disclosure, lower label 114 and upper label 116 reside adjacent to each other on carrier 112. In at least one embodiment of an auto-applied upper and lower label system according to the present disclosure, a plurality of lower labels 114 and upper labels 116 reside alternately on carrier 112. In at least one embodiment of an auto-applied upper and lower label system 100 according to the present disclosure, each lower label 114 comprises a packing list label, and each upper label 116 comprises a shipping label.

According to at least one embodiment of the present disclosure, lower label 114 comprises leading edge 118, trailing edge 122, side edges 120 and 124, side tabs 131 and 133, trailing tab 135, and removable region 144. In an embodiment of auto-applied upper and lower label system 100 according to the present disclosure such as is shown in FIG. 9A, a trailing edge of side tabs 131 and 133 is substantially even with trailing edge 122. In an embodiment of auto-applied upper and lower label system 100 according to the present disclosure such as is shown in FIG. 9B, a trailing edge of side tabs 131 and 133 is not even with trailing edge 122. One or more lines of weakness 136 and 137 define a boundary between removable region 144 and side tabs 131 and 133, respectively. One or more lines of line of weakness 139 define a boundary between removable region 144 and trailing tab 135. In at least one embodiment of the present disclosure, removable region 144 comprises a removable packing list.

According to at least one embodiment of the present disclosure, upper label 116 is bounded by leading edge 126, trailing edge 130, and side edges 128 and 132. One or more lines of weakness 138 define a boundary of removable segment 146. Frame 142 lies between a line of weakness 138 and leading edge 126, trailing edge 130, and side edges 128 and 132. According to at least one embodiment of the present disclosure, upper label 116 comprises one or more holes 147. Holes 147a, 147b, 147c, 147d, 147e, 147f, 147g, and 147h are shown in the embodiment of label system 100 of FIGS. 9A-B. Other embodiments of label system 100 may have a greater number or lesser number of holes. According to at least one embodiment of the present disclosure, holes 147 extend through segment 146 and carrier 112. In at least one embodiment of the present disclosure, holes 147 extend only through segment 146.

According to at least one embodiment of the present disclosure, prior to use upper label 116 and lower label 114 are deployed adjacent to each other on carrier 112, thereby enabling upper label 116 and lower label 114 to be dispensed from carrier 112 in sequence as discussed herein. Carrier 112 comprises, in at least one embodiment, release coating 115 on the surface of carrier 112 facing the undersides of lower label 114 and upper label 116. In at least one embodiment of the present disclosure, release coating 115 is a silicone release coating. According to at least one embodiment of label system 100 according to the present disclosure, adhesive 113 is interposed between release coat 115 and the undersides of lower label 114 and upper label 116, as discussed hereinafter. In at least one embodiment of the present disclosure, adhesive 113 is a pressure sensitive adhesive.

In at least one embodiment, carrier 112 comprises transverse stripe 134. Transverse stripe 134 comprises a color or shading of a region of carrier 112 that is in contrast with the color of the remainder of carrier 112. In at least one embodiment, a transverse stripe 134 is located after each upper label 116 and before the adjacent lower label 114. In at least one embodiment, a transverse stripe 134 is located after each lower label 114 and before the adjacent upper label 116. In at least one embodiment, a transverse stripe 134 overlaps the trailing edge 130 of each upper label 116 and the leading edge 118 of each lower label 114.

In at least one embodiment of an auto-applied upper and lower label system according to the present disclosure, one or more transverse stripes 134 are used in conjunction with a detection apparatus for purposes of synchronizing the dispensing of the upper label 116 and the adjacent lower label 114.

Figure 10B:
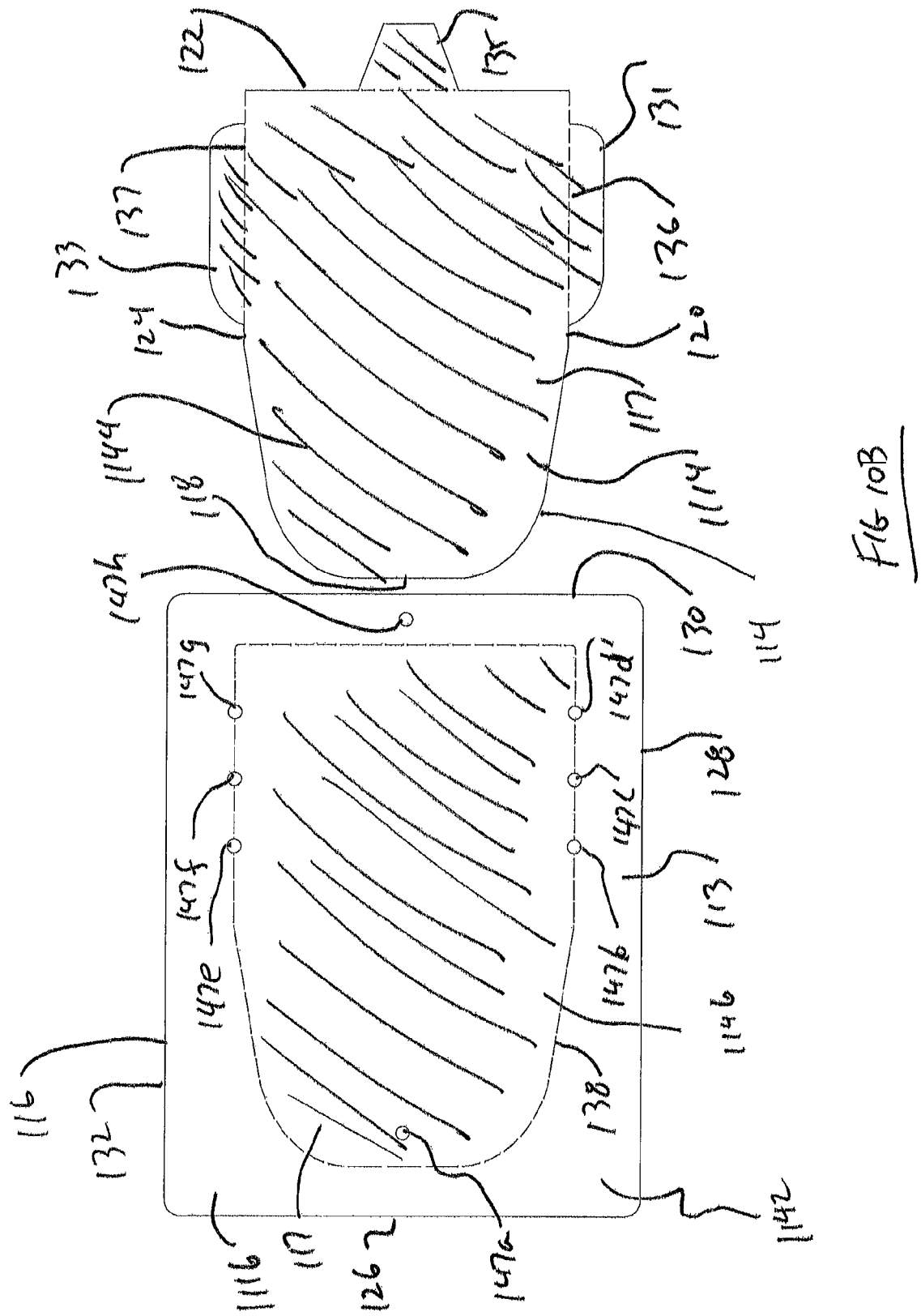
FIG. 10B shows the underside of a lower label and the undersurface of an upper label according to at least one embodiment of the present disclosure.

FIGS. 10A-B shows the underside of lower label 114 and the undersurface of upper label 116 according to at least one embodiment of the present disclosure, with carrier 112 not visible for purposes of clarity. Shown in FIGS. 10A-B is underside 1114 of lower label 114, comprising leading edge 118, trailing edge 122, side edges 120 and 124, side tabs 131 and 133, trailing tab 135, and removable region underside 1144. In an embodiment of auto-applied upper and lower label system 100 according to the present disclosure such as is shown in FIG. 10A, a trailing edge of side tabs 131 and 133 is substantially even with trailing edge 122. In an embodiment of auto-applied upper and lower label system 100 according to the present disclosure such as is shown in FIG. 10B, a trailing edge of side tabs 131 and 133 is not even with trailing edge 122. Also shown in FIGS. 10A-B is undersurface 1116 of upper label 116, which is bounded by leading edge 126, trailing edge 130, and side edges 128 and 132.

In at least one embodiment, underside 1114 of lower label 114 is substantially free of adhesive. In at least one embodiment, underside 1114 of lower label 114 comprises adhesive 113 on all or substantially all of its surface area, but underside 1114 comprises an adhesive deadening agent 117 such as, for example, a non-adhesive varnish, covers adhesive 113 in those areas thereby rendering adhesive 113 ineffective in those areas. In at least one embodiment of the present disclosure, adhesive deadening agent 117 is selected so as to not render adhesive 113 completely ineffective in those areas treated by adhesive deadening agent 117. In such an embodiment, after treatment of adhesive 113 with adhesive deadening agent 117, the treated areas retain a slight tackiness. In at least one embodiment, all of underside 1114 is free of or substantially free of adhesive properties, although in such an embodiment underside 1114 may retain a slight tackiness. In at least one alternate embodiment, at least a portion of the underside of trailing tab 135 may comprise adhesive 113 on all or substantially all of its surface area. In such an embodiment, adhesive 113 serves to removeably adhere lower label 114 to carrier 112 until lower label 114 is dispensed.

In at least one embodiment of the present disclosure, undersurface 1116 of upper label 116 comprises a first portion 1142 and a second portion 1146, separated by a line of weakness 138. First portion 1142 comprises the undersurface of frame 142. Second portion 1146 comprises the undersurface of removable segment 146. In at least one embodiment, first portion 1142 comprises adhesive 113 on all or substantially all of its surface area. In at least one embodiment, second portion 1146 is free of or substantially free of adhesive. In at least one embodiment, second portion 1146 comprises adhesive 113 on all or substantially all of its surface area, but an adhesive deadening agent 117 such as, for example, a non-adhesive varnish, covers adhesive 113 in those areas thereby rendering adhesive 113 ineffective in those areas. In at least one embodiment of the present disclosure, adhesive deadening agent 117 is selected so as to not render adhesive 113 completely ineffective in those areas treated by adhesive deadening agent 117. In such an embodiment, after treatment of adhesive 113 with adhesive deadening agent 117, the treated areas retain a slight tackiness.

FIG. 11A shows a cross-sectional view of an auto-applied upper and lower label system according to at least one embodiment of the present disclosure taken on line XI-XI of FIG. 9A or FIG. 9B. The auto-applied upper and lower label system is shown in FIG. 11A in a semi-exploded state for purposes of clarity. Shown in FIG. 11A are carrier 112, adhesive 113, lower label 114 including leading edge 118 and trailing tab 135, release coating 115, upper label 116 including leading edge 126 and trailing edge 130, hole 147a, and hole 147h. As shown in this embodiment of an auto-applied upper and lower label system according to the present disclosure, underside 1144 and second portion 1146 are free of adhesive 113.

FIG. 11B shows a cross-sectional view of an auto-applied upper and lower label system according to at least one embodiment of the present disclosure taken on line XI-XI of FIG. 9A or FIG. 9B. The auto-applied upper and lower label system is shown in FIG. 11B in a semi-exploded state for purposes of clarity. Shown in FIG. 11B are carrier 112, adhesive 113, lower label 114 including leading edge 118 and trailing tab 135, release coating 115, upper label 116 including leading edge 126 and trailing edge 130, adhesive deadening agent 117, hole 147a, and hole 147h. In at least one other embodiment of the present disclosure, underside 1144 comprises adhesive 113 on all or substantially all of its surface area, but adhesive deadening agent 117 such as, for example, a non-adhesive varnish, covers adhesive 113 in those areas. Second portion 1146 also comprises adhesive 113 on all or substantially all of its surface area, but adhesive deadening agent 117 such as, for example, a non-adhesive varnish, covers adhesive 113 in those areas.

Figure 12A:
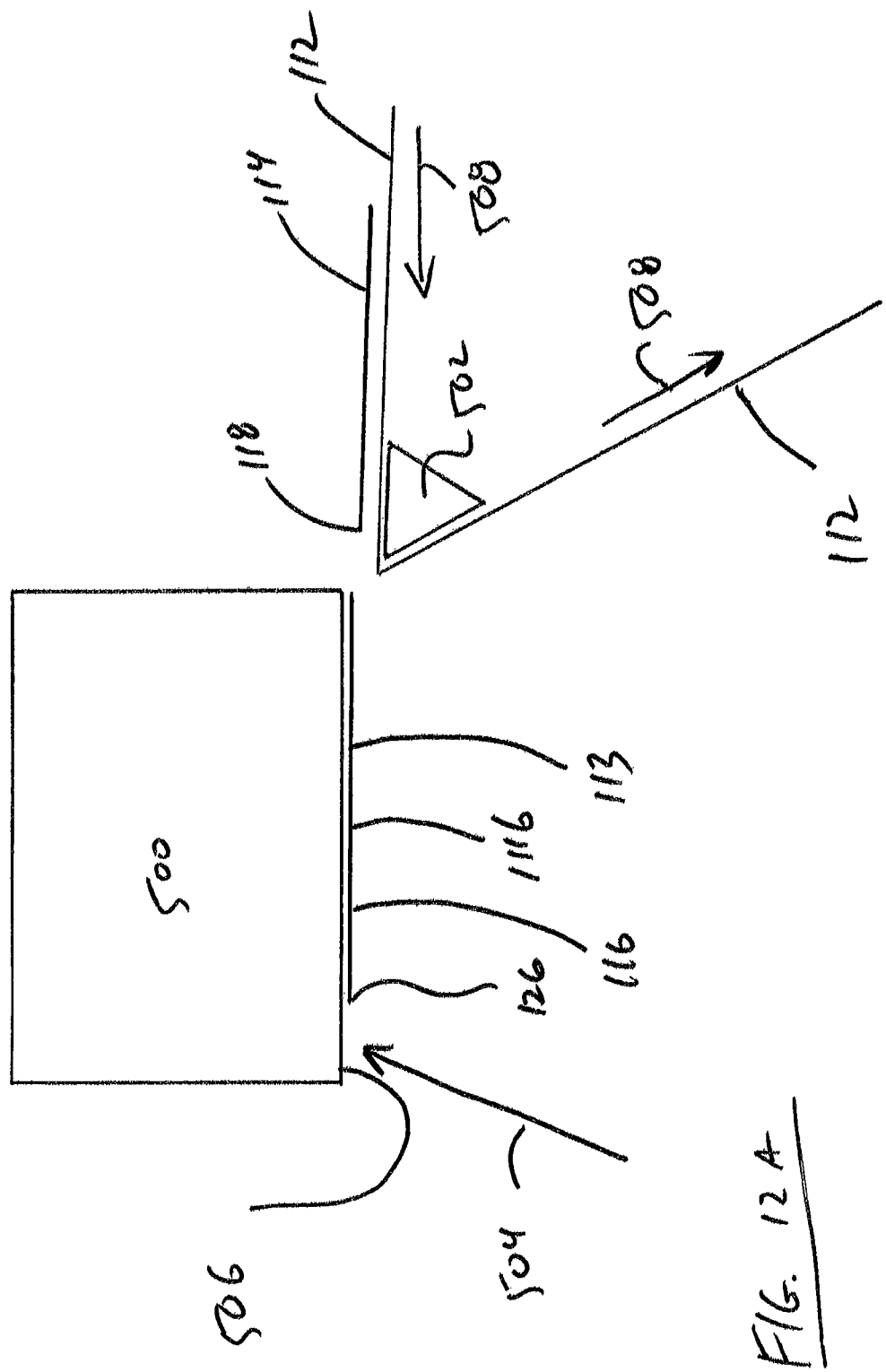
FIGS. 12A-B show side views of an auto-applied upper and lower label system according to at least one embodiment of the present disclosure.
Figure 12B:
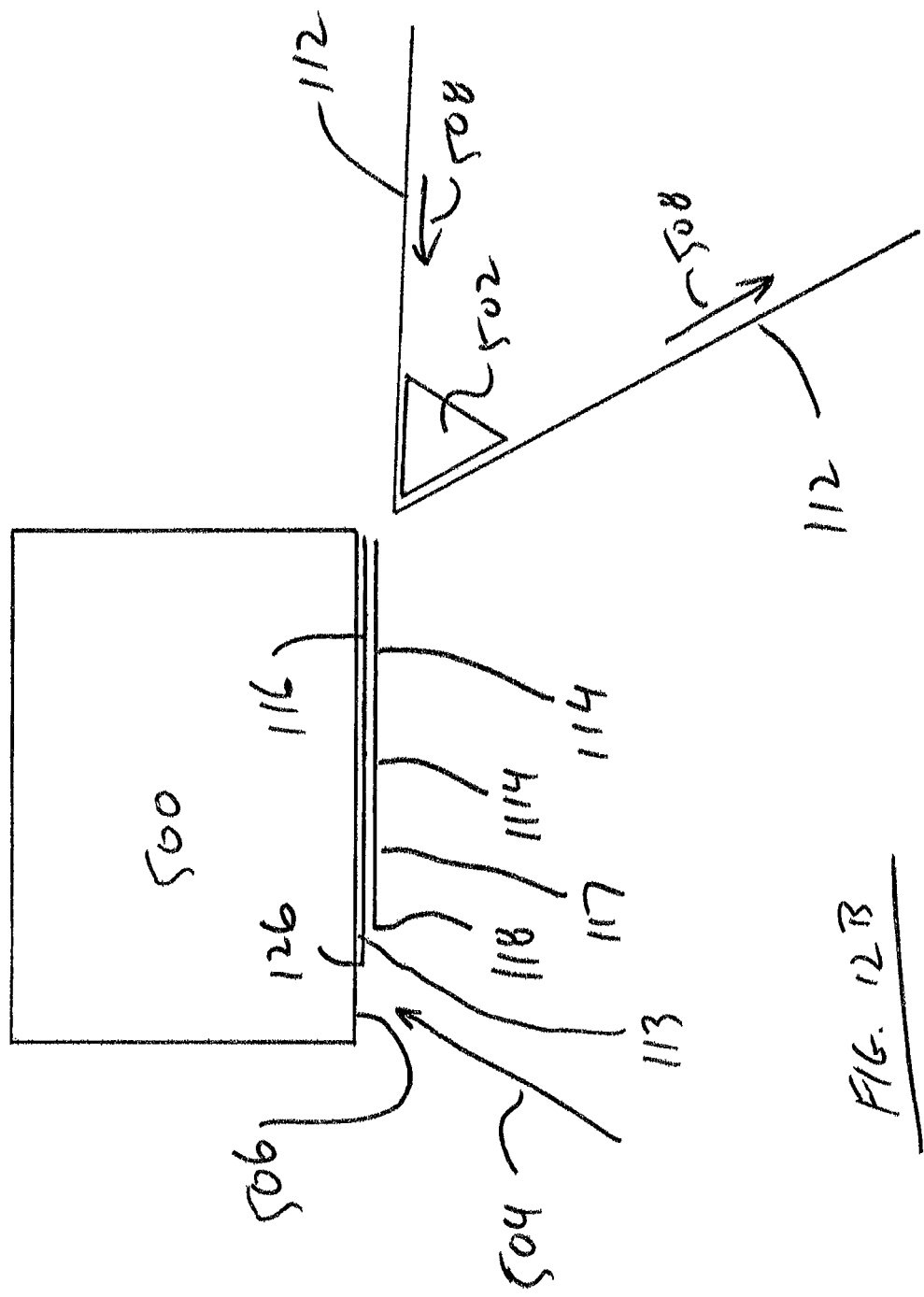

FIGS. 12A-B show a side view of an auto-applied upper and lower label system according to at least one embodiment of the present disclosure while in use. As shown in FIG. 12A, carrier 112 with upper label 116 and lower label 114 thereon is advanced in direction 508. Carrier 112 is routed around member 502, causing upper label 116 to be dispensed from carrier 112 beginning with leading edge 126. At least a portion of undersurface 1116 of upper label 116 comprises adhesive 113 after it is dispensed from carrier 112. As upper label 116 is dispensed from carrier 112, upper label 116 passes under label applicator 500. Force 504 generated by label applicator 500 causes upper label 116 to be lifted and held against screen 506. Screen 506 forms a lower surface of label applicator 500.

Turning now to FIG. 12B, after upper label 116 is dispensed from carrier 112, carrier 112 with lower label 114 thereon is advanced in direction 508. Carrier 112 is routed around member 502, causing lower label 114 to be dispensed from carrier 112 beginning with leading edge 118. As lower label 114 is dispensed from carrier 112, lower label 114 passes under label applicator 500. Force 504 generated by label applicator 500 causes lower label 114 to be lifted and held against, and in registration with, upper label 116. In such an embodiment, lower label 114 is not in contact with screen 506. Because in at least one such embodiment of an auto-applied upper and lower label system according to the present disclosure upper label 116 comprises one or more holes 147, even though the area of lower label 114 is less than the area of upper label 116, if force 504 is a vacuum force, force 504 acts through holes 147 in upper label 116 to hold lower label 114 against, and in registration with, upper label 116. Undersurface 1116 begins to be adhered to lower label 114 by adhesive 113.

In at least one embodiment of an auto-applied upper and lower label system according to the present disclosure, prior to the time upper label 116 is dispensed from carrier 112, indicia is printed on or applied to upper label 116. In an embodiment of applied upper and lower label system according to the present disclosure where upper label 116 is a shipping label, indicia, such as, for example, destination address and/or other relevant shipping indicia, may be printed on or applied to upper label 116.

In at least one embodiment of an auto-applied upper and lower label system according to the present disclosure, prior to the time lower label 114 is dispensed from carrier 112, indicia is printed on or applied to lower label 114. In an embodiment of applied upper and lower label system according to the present disclosure where lower label 114 is a packing list label, indicia, such as, for example, container contents and/or other packing list indicia, may be printed on or applied to lower label 114.

In at least one embodiment, label applicator 500 comprises a printing capability such as, for example, a thermal transfer printer or a direct thermal printer. In such an embodiment, indicia may be applied to upper label 116 and/or lower label 114 by label applicator 500.

FIG. 13 shows the underside of label applicator 500 after upper label 116 and lower label 114 have been dispensed thereon, according to at least one embodiment of an auto-applied upper and lower label system according to the present disclosure. Visible in FIG. 13 is screen 506. Shown in FIG. 13 are undersurface 1116 comprising first portion 1142 and second portion 1146 separated by a line of weakness 138. First portion 1142 comprises effective amount of adhesive 113 on its surface area. Also shown in FIG. 13 is underside 1114 of lower label 114, comprising side tabs 131 and 133, trailing tab 135, lines of weakness 136, 137, and 139, and removable region underside 1144. As shown in FIG. 13, in at least one embodiment of an auto-applied upper and lower label system according to the present disclosure only tabs 131, 133, and 135 come into contact with adhesive 113 on first portion 1142. Accordingly, in such an embodiment lower label 114 is adhered to undersurface 1116 only at tabs 131, 133, and 135.

FIG. 14 shows a side view of the application of upper label 116 and lower label 114 to a surface 601 of container 600, according to at least one embodiment of the present disclosure. As shown in FIG. 14, label applicator 500 moves in direction 602, thereby moving upper label 116 and lower label 114 in direction 604 until the underside of lower label 114 is in contact with surface 601 of container 600. The pressure of label applicator 500 against surface 601 of container 600 causes adhesive 113 to adhere the undersurface 1116 of upper label 116 to surface 601 of container 600, and completes the adhesion of undersurface 1116 to lower label 114.

FIG. 15 shows lower label 114 and upper label 116 adhered to a surface of container 600. Shown in FIG. 15 is upper label 116 comprising a line of weakness 138 and removable segment 146. Lower label 114 comprising removable region 144 is concealed under upper label 116, with removable region 144 in registration with removable segment 146.

Figure 16A:
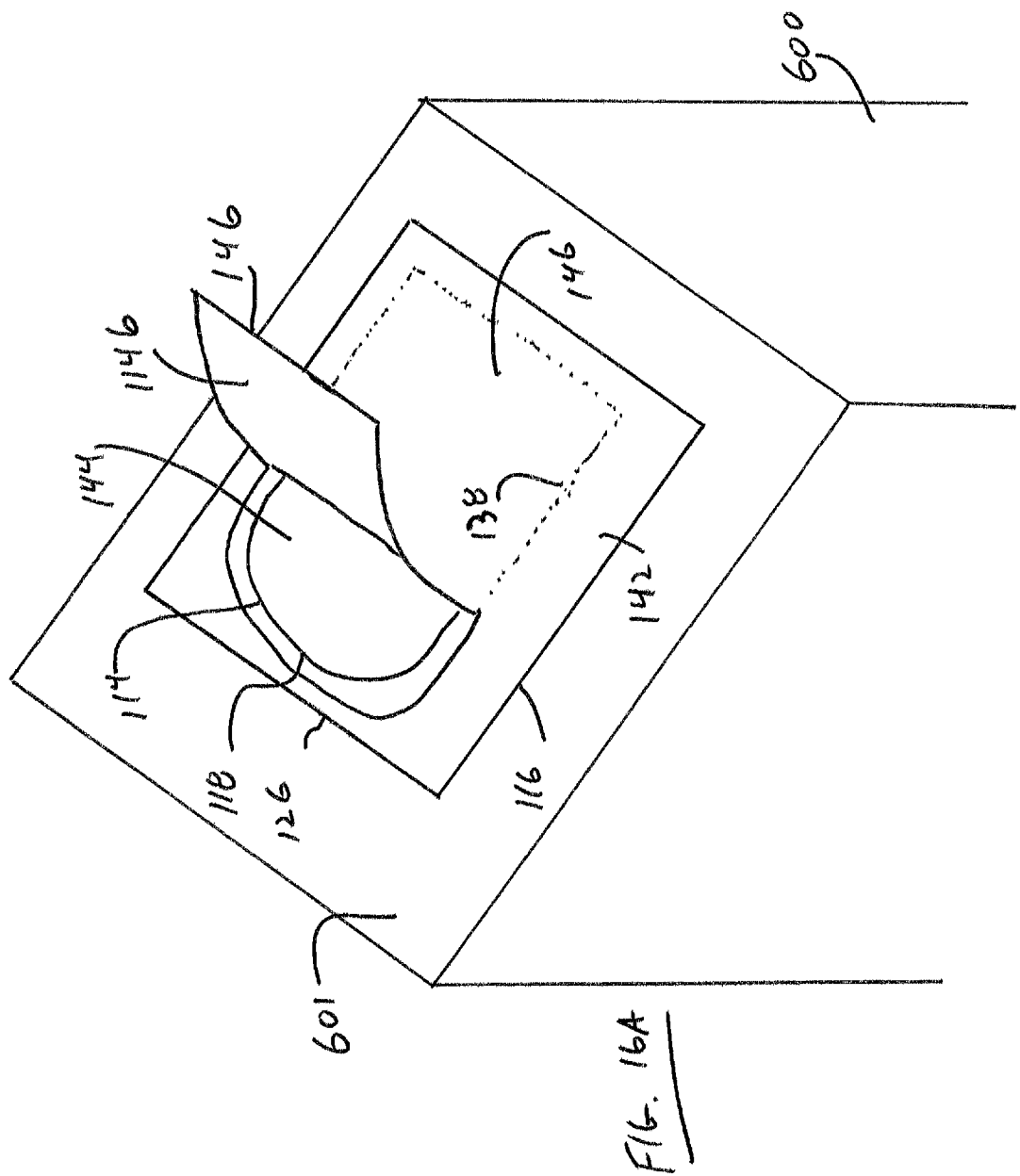
FIGS. 16A-B show an auto-applied upper and lower label system according to at least one embodiment of the present disclosure.
Figure 16B:
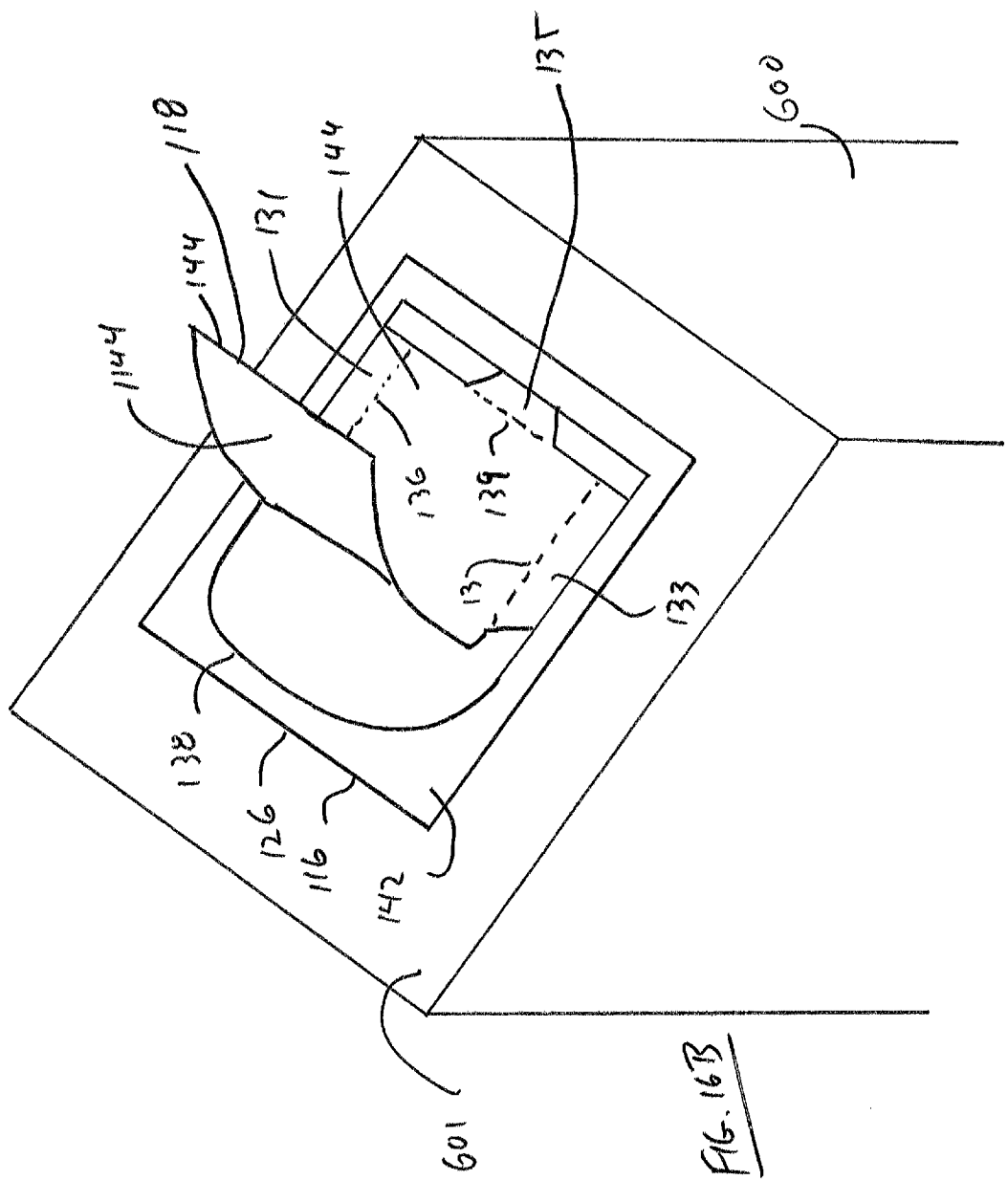

FIGS. 16A-B show an embodiment of an auto-applied upper and lower label system according to the present disclosure. As shown in FIG. 16A, removable segment 146 of upper label 116 is partially removed from upper label 116 along a line of weakness 138. Removing segment 146 in this fashion reveals removable region 144. In an embodiment of applied upper and lower label system according to the present disclosure where lower label 114 is a packing list label, removable region 144 may comprise a removable packing list. Because in such an embodiment of the present disclosure underside 1146 has no more than very limited adhesive properties, removable region 144 is not damaged or defaced by removing segment 146. As segment 146 is removed, frame 142 of upper label 116 remains adhered to lower label 114 at tabs 131, 133, and 135 and also to surface 601.

As shown in FIG. 16B, removable region 144 may be removed from lower label 114 along lines of weakness 136, 137, and 139. In an embodiment of applied upper and lower label system according to the present disclosure where lower label 114 is a packing list label, removable region 144 may comprise a removable packing list. Because in such an embodiment of the present disclosure underside 1144 has no more than very limited adhesive properties, removable region 144 is readily removable from surface 601 of container 600. After removable region 144 is removed, frame 142 of upper label 116 remains adhered to surface 601 of container 600, and tabs 131, 133, and 135 are retained under frame 142.

FIG. 17 shows auto-applied upper and lower label system 101 according to at least one embodiment of the present disclosure. Shown in FIG. 17 are auto-applied lower label 114 and auto-applied upper label 116. In at least one embodiment of the present disclosure, lower label 114 and upper label 116 reside adjacent to each other on carrier 112. In at least one embodiment of an auto-applied upper and lower label system according to the present disclosure, a plurality of lower labels 114 and upper labels 116 reside alternately on carrier 112. In at least one embodiment of an auto-applied upper and lower label system 101 according to the present disclosure, each upper label 116 comprises a shipping label, and each lower label 114 comprises a return label.

According to at least one embodiment of the present disclosure, lower label 114 comprises leading edge 118, trailing edge 122, side edges 120 and 124, side tabs 131 and 133, and trailing tab 135. In an embodiment of auto-applied upper and lower label system 101 according to the present disclosure, a trailing edge of side tabs 131 and 133 may be substantially even with trailing edge 122.

According to at least one embodiment of the present disclosure, upper label 116 is bounded by leading edge 126, trailing edge 130, and side edges 128 and 132. One or more lines of weakness 138 define a boundary of removable segment 146. Frame 142 lies between a line of weakness 138 and leading edge 126, trailing edge 130, and side edges 128 and 132. According to at least one embodiment of the present disclosure, upper label 116 comprises one or more holes 147. Holes 147a-147h are shown in the embodiment of label system 101 of FIG. 17. Other embodiments of label system 101 may have a greater number or lesser number of holes. According to at least one embodiment of the present disclosure, holes 147 extend through segment 146 and carrier 112. In at least one embodiment of the present disclosure, holes 147 extend only through segment 146.

According to at least one embodiment of the present disclosure, prior to use upper label 116 and lower label 114 are deployed adjacent to each other on carrier 112, thereby enabling upper label 116 and lower label 114 to be dispensed from carrier 112 in sequence as discussed herein. Carrier 112 comprises, in at least one embodiment, release coating 115 on the surface of carrier 112 facing the underside of lower label 114 and undersurface of upper label 116. In at least one embodiment of the present disclosure, release coating 115 is a silicone release coating. According to at least one embodiment of label system 101 according to the present disclosure, adhesive 113 is interposed between release coat 115 and the underside of lower label 114 and undersurface of upper label 116, as discussed hereinafter. In at least one embodiment of the present disclosure, adhesive 113 is a pressure sensitive adhesive.

In at least one embodiment, carrier 112 comprises transverse stripe 134. Transverse stripe 134 comprises a color or shading of a region of carrier 112 that is in contrast with the color of the remainder of carrier 112. In at least one embodiment, a transverse stripe 134 is located after each upper label 116 and before the adjacent lower label 114. In at least one embodiment, a transverse stripe 134 is located after each lower label 114 and before the adjacent upper label 116. In at least one embodiment, a transverse stripe 134 overlaps the trailing edge 130 of each upper label 116 and the leading edge 118 of each lower label 114.

In at least one embodiment of an auto-applied upper and lower label system according to the present disclosure, one or more transverse stripes 134 are used in conjunction with a detection apparatus for purposes of synchronizing the dispensing of the upper label 116 and the adjacent lower label 114.

FIG. 18 shows the underside of lower label 114 and the undersurface of upper label 116 according to at least one embodiment of the present disclosure, with carrier 112 not visible for purposes of clarity. Shown in FIG. 18 is underside 1114 of lower label 114, comprising leading edge 118, trailing edge 122, side edges 120 and 124, side tabs 131 and 133, and trailing tab 135. In an embodiment of auto-applied upper and lower label system 101 according to the present disclosure, a trailing edge of side tabs 131 and 133 may be substantially even with trailing edge 122. Also shown in FIG. 18 is undersurface 1116 of upper label 116, which is bounded by leading edge 126, trailing edge 130, and side edges 128 and 132.

In at least one embodiment, underside 1114 of lower label 114 comprises adhesive 113 on at least a portion of its surface area. In at least one embodiment, underside 1114 of lower label 114 comprises adhesive 113 on all or substantially all of its surface area. In at least one embodiment of the present disclosure, undersurface 1116 of upper label 116 comprises a first portion 1142 and a second portion 1146, separated by a line of weakness 138. First portion 1142 comprises the undersurface of frame 142. Second portion 1146 comprises the undersurface of removable segment 146. In at least one embodiment, first portion 1142 comprises adhesive 113 on all or substantially all of its surface area. In at least one embodiment, second portion 1146 is free of or substantially free of adhesive. In at least one embodiment, second portion 1146 comprises adhesive 113 on all or substantially all of its surface area, but an adhesive deadening agent 117 such as, for example, a non-adhesive varnish, covers adhesive 113 in those areas thereby rendering adhesive 113 ineffective in those areas. In at least one embodiment of the present disclosure, adhesive deadening agent 117 is selected so as to not render adhesive 113 completely ineffective in those areas treated by adhesive deadening agent 117. In such an embodiment, after treatment of adhesive 113 with adhesive deadening agent 117, the treated areas retain a slight tackiness.

Figure 19A:
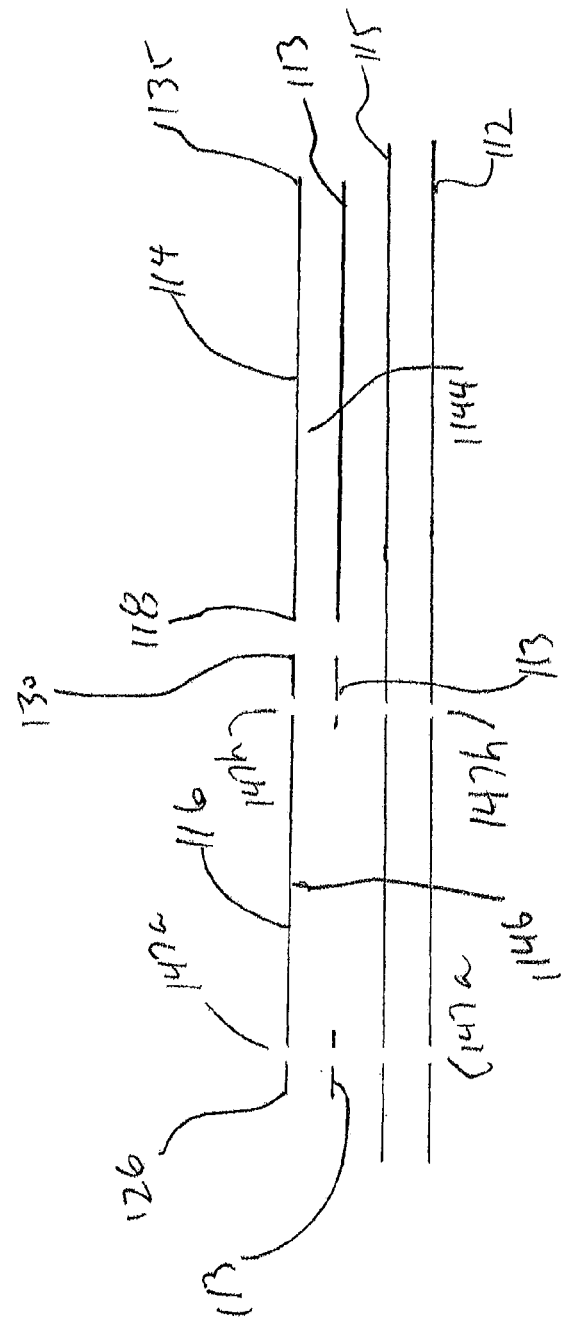
FIG. 19A shows a cross-sectional view of an auto-applied upper and lower label system according to at least one embodiment of the present disclosure.

FIG. 19A shows a cross-sectional view of an auto-applied upper and lower label system according to at least one embodiment of the present disclosure taken on line XIX-XIX of FIG. 17. The auto-applied upper and lower label system is shown in FIG. 19A in a semi-exploded state for purposes of clarity. Shown in FIG. 19A are carrier 112, adhesive 113, lower label 114 including leading edge 118 and trailing tab 135, release coating 115, upper label 116 including leading edge 126 and trailing edge 130, hole 147a, and hole 147h. As shown in this embodiment of an auto-applied upper and lower label system according to the present disclosure, second portion 1146 is free of adhesive 113 and underside 1144 comprises adhesive 113 on all or substantially all of its surface area.

FIG. 19B shows a cross-sectional view of an auto-applied upper and lower label system according to at least one embodiment of the present disclosure taken on line XIX-XIX of FIG. 17. The auto-applied upper and lower label system is shown in FIG. 19B in a semi-exploded state for purposes of clarity. Shown in FIG. 19B are carrier 112, adhesive 113, lower label 114 including leading edge 118 and trailing tab 135, release coating 115, upper label 116 including leading edge 126 and trailing edge 130, adhesive deadening agent 117, hole 147a, and hole 147h. In at least one other embodiment of the present disclosure, underside 1144 comprises adhesive 113 on all or substantially all of its surface area. Second portion 1146 also comprises adhesive 113 on all or substantially all of its surface area, but adhesive deadening agent 117 such as, for example, a non-adhesive varnish, covers adhesive 113 in that area.

Auto-applied upper and lower label system 101 according to at least one embodiment of the present disclosure may be automatically applied to a surface through the use of apparatuses and processes substantially similar to the apparatuses and processes shown and described in FIGS. 12A-15 and this written description. Auto-applied upper and lower label system 101 according to at least one embodiment of the present disclosure may be used in a manner substantially similar to manner shown and described in FIGS. 16A-16B and this written description, provided that because underside 1114 of lower label 114 of auto-applied upper and lower label system 101 according to at least one embodiment of the present disclosure comprises adhesive 113 on all or substantially all of its surface area, lower label 114 of auto-applied upper and lower label system 101 is not readily removable from the surface to which it is applied. According to at least one embodiment of auto-applied upper and lower label system 101 according to the present disclosure, upper label 116 comprises shipping address indicia and lower label 114 comprises return shipping address indicia. According to such an embodiment, if a container comprising upper label 116 and lower label 114 is to be returned to its source, upon receipt the recipient may remove upper label 116 to reveal return shipping address indicia on lower label 114. The container then may be shipped back to its source.

Figure 20:
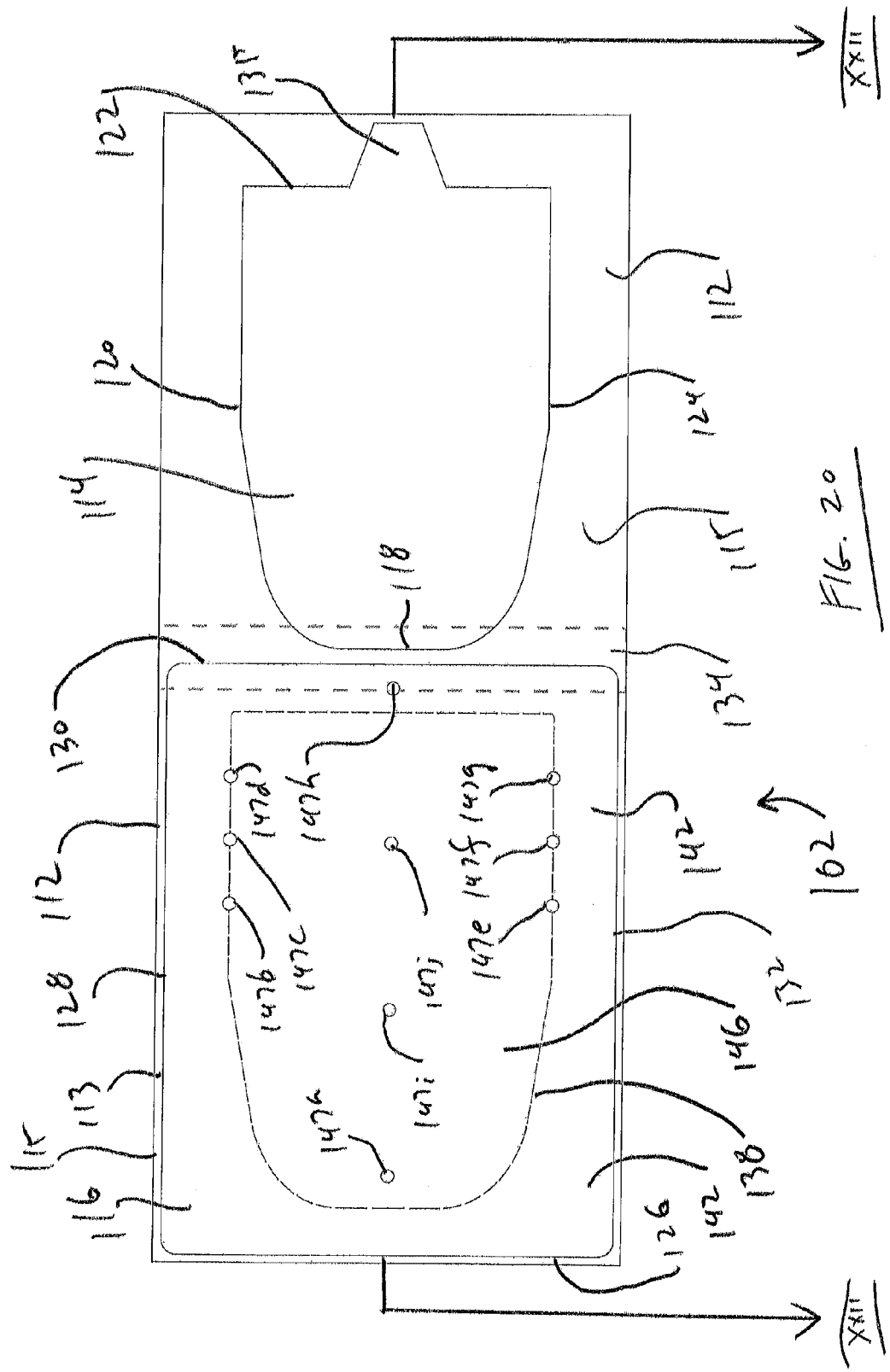
FIG. 20 shows an auto-applied upper and lower label system according to at least one embodiment of the present disclosure.

FIG. 20 shows auto-applied upper and lower label system 102 according to at least one embodiment of the present disclosure. Shown in FIG. 20 are auto-applied lower label 114 and auto-applied upper label 116. In at least one embodiment of the present disclosure, lower label 114 and upper label 116 reside adjacent to each other on carrier 112. In at least one embodiment of an auto-applied upper and lower label system according to the present disclosure, a plurality of lower labels 114 and upper labels 116 reside alternately on carrier 112. In at least one embodiment of an auto-applied upper and lower label system 102 according to the present disclosure, each lower label 114 comprises a packing list label, and each upper label 116 comprises a shipping label.

According to at least one embodiment of the present disclosure, lower label 114 comprises leading edge 118, trailing edge 122, side edges 120 and 124, and trailing tab 135. According to at least one embodiment of the present disclosure, upper label 116 is bounded by leading edge 126, trailing edge 130, and side edges 128 and 132. One or more lines of weakness 138 define a boundary of removable segment 146. Frame 142 lies between a line of weakness 138 and leading edge 126, trailing edge 130, and side edges 128 and 132. According to at least one embodiment of the present disclosure, upper label 116 comprises one or more holes 147. Holes 147a-147i are shown in the embodiment of label system 102 of FIG. 20. Other embodiments of label system 102 may have a greater number or lesser number of holes. According to at least one embodiment of the present disclosure, holes 147 extend through segment 146 and carrier 112. In at least one embodiment of the present disclosure, holes 147 extend only through segment 146.

According to at least one embodiment of the present disclosure, prior to use upper label 116 and lower label 114 are deployed adjacent to each other on carrier 112, thereby enabling upper label 116 and lower label 114 to be dispensed from carrier 112 in sequence as discussed herein. Carrier 112 comprises, in at least one embodiment, release coating 115 on the surface of carrier 112 facing the underside of lower label 114 and undersurface of upper label 116. In at least one embodiment of the present disclosure, release coating 115 is a silicone release coating. According to at least one embodiment of label system 102 according to the present disclosure, adhesive 113 is interposed between release coat 115 and the underside of lower label 114 and undersurface of upper label 116, as discussed hereinafter. In at least one embodiment of the present disclosure, adhesive 113 is a pressure sensitive adhesive.

In at least one embodiment, carrier 112 comprises transverse stripe 134. Transverse stripe 134 comprises a color or shading of a region of carrier 112 that is in contrast with the color of the remainder of carrier 112. In at least one embodiment, a transverse stripe 134 is located after each upper label 116 and before the adjacent lower label 114. In at least one embodiment, a transverse stripe 134 is located after each lower label 114 and before the adjacent upper label 116. In at least one embodiment, a transverse stripe 134 overlaps the trailing edge 130 of each upper label 116 and the leading edge 118 of each lower label 114.

In at least one embodiment of an auto-applied upper and lower label system according to the present disclosure, one or more transverse stripes 134 are used in conjunction with a detection apparatus for purposes of synchronizing the dispensing of the upper label 116 and the adjacent lower label 114.

Figure 21:
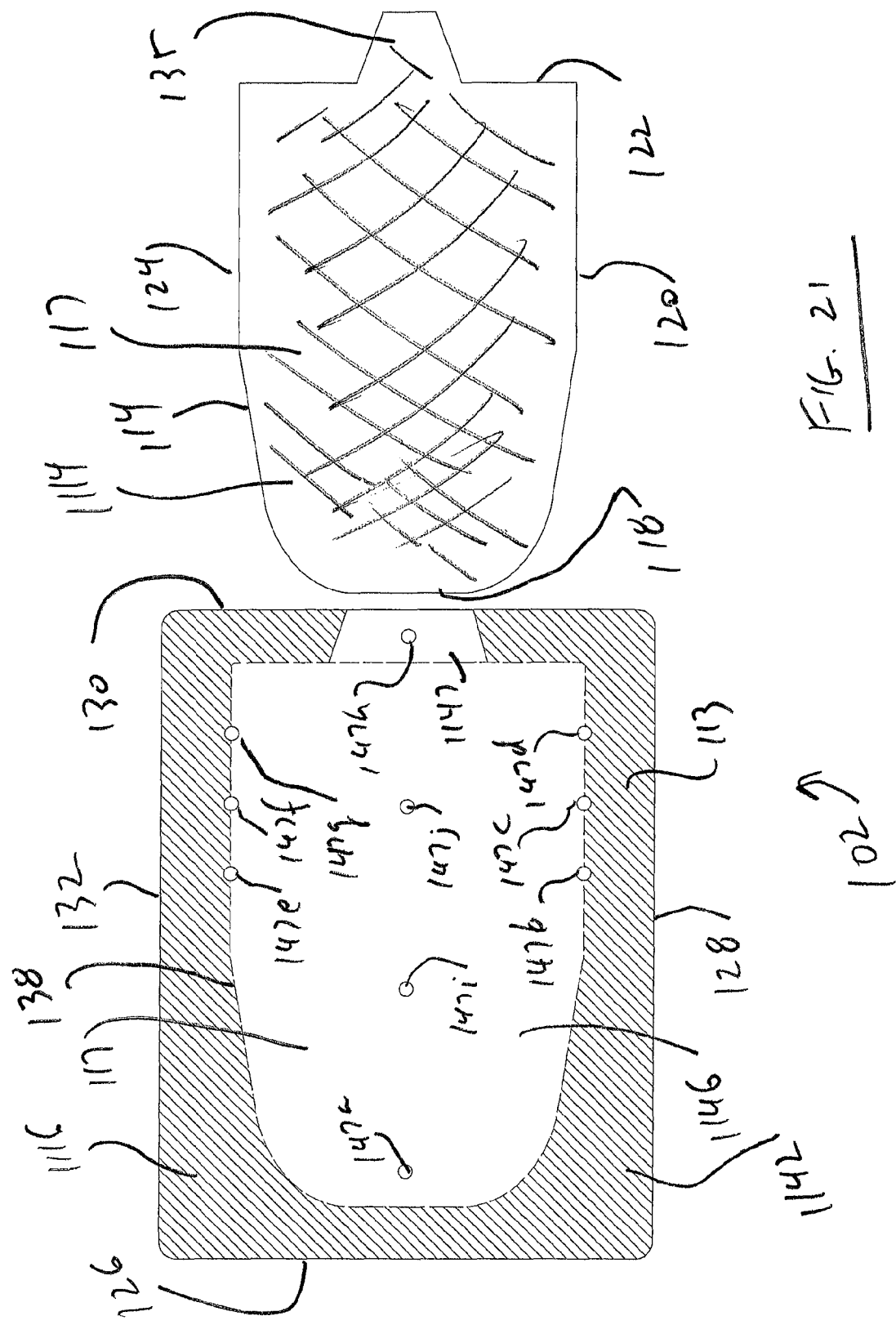
FIG. 21 shows the underside of a lower label and the undersurface of an upper label according to at least one embodiment of the present disclosure.

FIG. 21 shows the underside of lower label 114 and the undersurface of upper label 116 according to at least one embodiment of the present disclosure, with carrier 112 not visible for purposes of clarity. Shown in FIG. 21 is underside 1114 of lower label 114, comprising leading edge 118, trailing edge 122, side edges 120 and 124, and trailing tab 135. Also shown in FIG. 21 is undersurface 1116 of upper label 116, which is bounded by leading edge 126, trailing edge 130, and side edges 128 and 132.

In at least one embodiment, underside 1114 of lower label 114 is free of or substantially free of adhesive. In at least one embodiment, underside 1114 comprises adhesive 113 on all or substantially all of its surface area, but an adhesive deadening agent 117 such as, for example, a non-adhesive varnish, covers adhesive 113 in those areas thereby rendering adhesive 113 ineffective in those areas. In at least one embodiment of the present disclosure, adhesive deadening agent 117 is selected so as to not render adhesive 113 completely ineffective in those areas treated by adhesive deadening agent 117. In such an embodiment, after treatment of adhesive 113 with adhesive deadening agent 117, the treated areas retain a slight tackiness.

In at least one embodiment of the present disclosure, undersurface 1116 of upper label 116 comprises a first portion 1142, a second portion 1146, and a third portion 1147. First portion 1142 and third portion 1147 comprise the undersurface of frame 142. Second portion 1146 comprises the undersurface of removable segment 146. In at least one embodiment of the present disclosure, first portion 1142 and second portion 1146 are separated by a line of weakness 138.

In at least one embodiment, first portion 1142 comprises adhesive 113 on all or substantially all of its surface area. In at least one embodiment, second portion 1146 and third portion 1147 are free of or substantially free of adhesive. In at least one embodiment, second portion 1146 and third portion 1147 comprise adhesive 113 on all or substantially all of their surface area, but an adhesive deadening agent 117 such as, for example, a non-adhesive varnish, covers adhesive 113 in those areas thereby rendering adhesive 113 ineffective in those areas. In at least one embodiment of the present disclosure, adhesive deadening agent 117 is selected so as to not render adhesive 113 completely ineffective in those areas treated by adhesive deadening agent 117. In such an embodiment, after treatment of adhesive 113 with adhesive deadening agent 117, the treated areas retain a slight tackiness, FIG. 22A shows a cross-sectional view of an auto-applied upper and lower label system according to at least one embodiment of the present disclosure taken on line XXII-XXII of FIG. 20. The auto-applied upper and lower label system is shown in FIG. 22A in a semi-exploded state for purposes of clarity. Shown in FIG. 22A are carrier 112, adhesive 113, lower label 114 including leading edge 118 and trailing tab 135, release coating 115, upper label 116 including leading edge 126 and trailing edge 130, hole 147a, hole 147h, hole 147i, and hole 147j. As shown in this embodiment of an auto-applied upper and lower label system according to the present disclosure, second portion 1146 is free of adhesive 113 and underside 1144 is free of adhesive 113.

FIG. 22B shows a cross-sectional view of an auto-applied upper and lower label system according to at least one embodiment of the present disclosure taken on line XXII-XXII of FIG. 20. The auto-applied upper and lower label system is shown in FIG. 22B in a semi-exploded state for purposes of clarity. Shown in FIG. 22B are carrier 112, adhesive 113, lower label 114 including leading edge 118 and trailing tab 135, release coating 115, upper label 116 including leading edge 126 and trailing edge 130, adhesive deadening agent 117, hole 147a, hole 147h, hole 147i, and hole 147j. In at least one other embodiment of the present disclosure, underside 1144 comprises adhesive 113 on all or substantially all of its surface area, but adhesive deadening agent 117 such as, for example, a non-adhesive varnish, covers adhesive 113 in that area. Second portion 1146 also comprises adhesive 113 on all or substantially all of its surface area, but adhesive deadening agent 117 such as, for example, a non-adhesive varnish, covers adhesive 113 in that area.

Auto-applied upper and lower label system 102 according to at least one embodiment of the present disclosure may be automatically applied to a surface through the use of apparatuses and processes substantially similar to the apparatuses and processes shown and described in FIGS. 12A-15 and this written description. Auto-applied upper and lower label system 102 according to at least one embodiment of the present disclosure may be used in a manner substantially similar to manner shown and described in FIGS. 16A-16B and this written description, provided that because third portion 1147 is either free of adhesive 113 or covered with an adhesive deadening agent 117, when lower label 114 is removed from the surface to which upper and lower label system 102 has been applied, all of lower label 114 including trailing tab 135 is removed from such surface.

Figure 23:
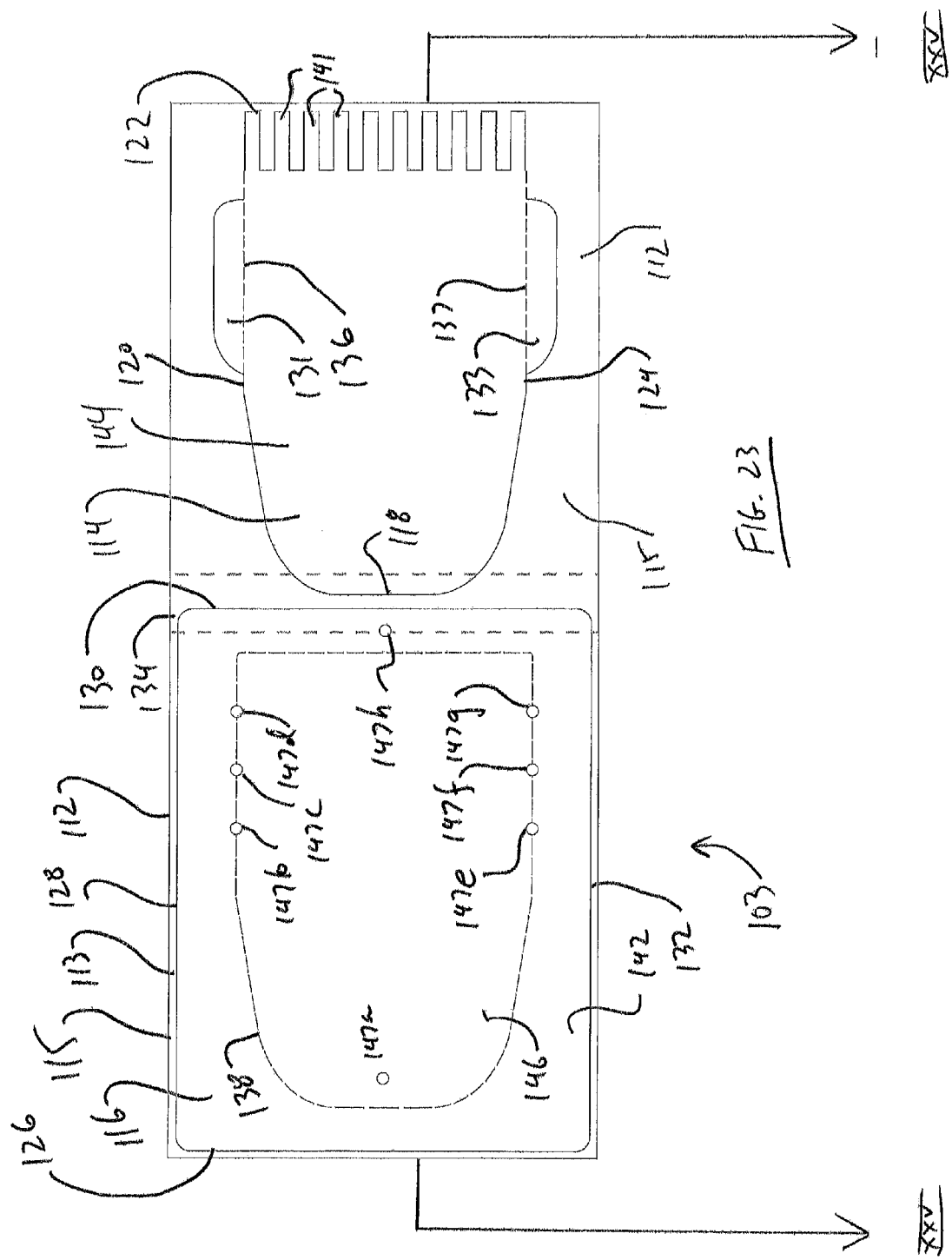
FIG. 23 shows an auto-applied upper and lower label system according to at least one embodiment of the present disclosure.

FIG. 23 shows auto-applied upper and lower label system 103 according to at least one embodiment of the present disclosure. Shown in FIG. 23 are auto-applied lower label 114 and auto-applied upper label 116. In at least one embodiment of the present disclosure, lower label 114 and upper label 116 reside adjacent to each other on carrier 112. In at least one embodiment of an auto-applied upper and lower label system according to the present disclosure, a plurality of lower labels 114 and upper labels 116 reside alternately on carrier 112. In at least one embodiment of an auto-applied upper and lower label system 103 according to the present disclosure, each upper label 116 comprises a shipping label, and each lower label 114 comprises a packing list label.

According to at least one embodiment of the present disclosure, lower label 114 comprises leading edge 118, trailing edge 122, side edges 120 and 124, side tabs 131 and 133, trailing tab 135, and removable region 144. One or more lines of weakness 136 and 137 define a boundary between removable region 144 and side tabs 131 and 133, respectively. In at least one such embodiment, trailing edge 122 comprises a plurality of trailing tabs 141. In at least one embodiment of the present disclosure, removable region 144 comprises a removable packing list.

According to at least one embodiment of the present disclosure, upper label 116 is bounded by leading edge 126, trailing edge 130, and side edges 128 and 132. One or more lines of weakness 138 define a boundary of removable segment 146. Frame 142 lies between a line of weakness 138 and leading edge 126, trailing edge 130, and side edges 128 and 132. According to at least one embodiment of the present disclosure, upper label 116 comprises one or more holes 147. Holes 147a-147h are shown in the embodiment of label system 103 of FIG. 23. Other embodiments of label system 103 may have a greater number or lesser number of holes. According to at least one embodiment of the present disclosure, holes 147 extend through segment 146 and carrier 112. In at least one embodiment of the present disclosure, holes 147 extend only through segment 146.

According to at least one embodiment of the present disclosure, prior to use upper label 116 and lower label 114 are deployed adjacent to each other on carrier 112, thereby enabling upper label 116 and lower label 114 to be dispensed from carrier 112 in sequence as discussed herein. Carrier 112 comprises, in at least one embodiment, release coating 115 on the surface of carrier 112 facing the underside of lower label 114 and undersurface of upper label 116. In at least one embodiment of the present disclosure, release coating 115 is a silicone release coating. According to at least one embodiment of label system 103 according to the present disclosure, adhesive 113 is interposed between release coat 115 and the underside of lower label 114 and undersurface of upper label 116, as discussed hereinafter. In at least one embodiment of the present disclosure, adhesive 113 is a pressure sensitive adhesive.

In at least one embodiment, carrier 112 comprises transverse stripe 134. Transverse stripe 134 comprises a color or shading of a region of carrier 112 that is in contrast with the color of the remainder of carrier 112. In at least one embodiment, a transverse stripe 134 is located after each upper label 116 and before the adjacent lower label 114. In at least one embodiment, a transverse stripe 134 is located after each lower label 114 and before the adjacent upper label 116. In at least one embodiment, a transverse stripe 134 overlaps the trailing edge 130 of each upper label 116 and the leading edge 118 of each lower label 114.

In at least one embodiment of an auto-applied upper and lower label system according to the present disclosure, one or more transverse stripes 134 are used in conjunction with a detection apparatus for purposes of synchronizing the dispensing of the upper label 116 and the adjacent lower label 114.

Figure 24:
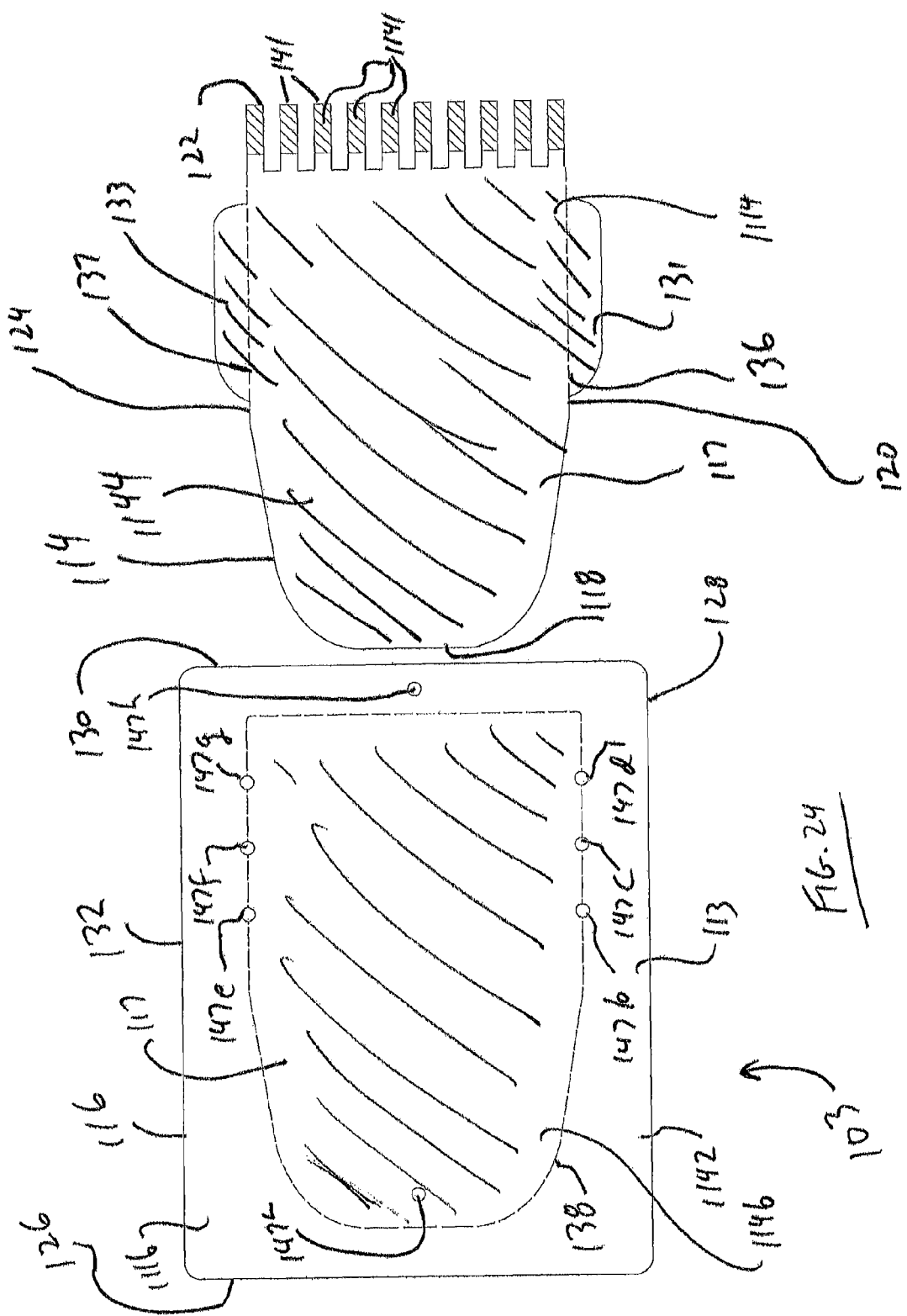
FIG. 24 shows the underside of a lower label and the undersurface of an upper label according to at least one embodiment of the present disclosure.

FIG. 24 shows the underside of lower label 114 and the undersurface of upper label 116 according to at least one embodiment of the present disclosure, with carrier 112 not visible for purposes of clarity. Shown in FIG. 24 is underside 1114 of lower label 114, comprising leading edge 118, trailing edge 122, side edges 120 and 124, side tabs 131 and 133, trailing tabs 141, and removable region underside 1144. In at least one embodiment, the underside of at least one of trailing tabs 141 comprises segment 1141. According to such an embodiment, each segment 1141 comprises adhesive 113 on all or substantially all of its surface area. In such an embodiment, each segment 1141 comprising adhesive 113 serves to removeably adhere packing list label 114 to carrier 112 until packing list label 114 is dispensed. According to such an embodiment, the rest of underside 1114 of packing list label 114 is substantially free of adhesive. In at least one embodiment, underside 1114 of packing list label 114 comprises adhesive 113 on all or substantially all of its surface area, but the portions of underside 1114 other than segments 1141 comprise an adhesive deadening agent 117 such as, for example, a non-adhesive varnish, covers adhesive 113 in those areas thereby rendering adhesive 113 ineffective in those areas. In at least one embodiment of the present disclosure, adhesive deadening agent 117 is selected so as to not render adhesive 113 completely ineffective in those areas treated by adhesive deadening agent 117. In such an embodiment, after treatment of adhesive 113 with adhesive deadening agent 117, the treated areas retain a slight tackiness. In at least one embodiment, all of underside 1114 is free of or substantially free of adhesive properties, although in such an embodiment underside 1114 may retain a slight tackiness.

Also shown in FIG. 24 is undersurface 1116 of upper label 116, which is bounded by leading edge 126, trailing edge 130, and side edges 128 and 132. In at least one embodiment of the present disclosure, undersurface 1116 of upper label 116 comprises a first portion 1142 and a second portion 1146, separated by a line of weakness 138. First portion 1142 comprises the undersurface of frame 142. Second portion 1146 comprises the undersurface of removable segment 146. In at least one embodiment, first portion 1142 comprises adhesive 113 on all or substantially all of its surface area. In at least one embodiment, second portion 1146 is free of or substantially free of adhesive. In at least one embodiment, second portion 1146 comprises adhesive 113 on all or substantially all of its surface area, but an adhesive deadening agent 117 such as, for example, a non-adhesive varnish, covers adhesive 113 in those areas thereby rendering adhesive 113 ineffective in those areas. In at least one embodiment of the present disclosure, adhesive deadening agent 117 is selected so as to not render adhesive 113 completely ineffective in those areas treated by adhesive deadening agent 117. In such an embodiment, after treatment of adhesive 113 with adhesive deadening agent 117, the treated areas retain a slight tackiness.

Figure 25:
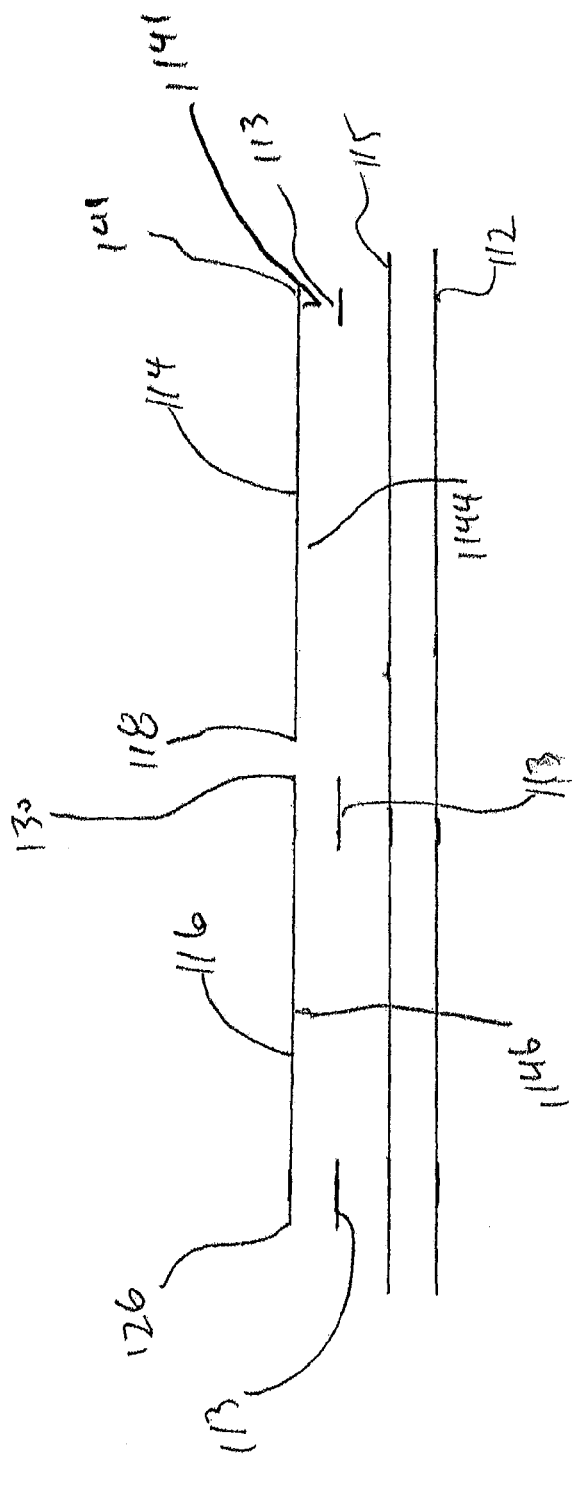
FIG. 25A shows a cross-sectional view of an auto-applied upper and lower label system according to at least one embodiment of the present disclosure.
FIG. 25B shows a cross-sectional view of an auto-applied upper and lower label system according to at least one embodiment of the present disclosure.

FIG. 25A shows a cross-sectional view of an auto-applied upper and lower label system according to at least one embodiment of the present disclosure taken on line XXV-XXV of FIG. 25. The auto-applied upper and lower label system is shown in FIG. 25A in a semi-exploded state for purposes of clarity. Shown in FIG. 25A are carrier 112, adhesive 113, lower label 114 including leading edge 118, a trailing tab 141 and a segment 1141, release coating 115, upper label 116 including leading edge 126 and trailing edge 130. As shown in this embodiment of an auto-applied upper and lower label system according to the present disclosure, second portion 1146 is free of adhesive 113 and underside 1144 is free of adhesive 113.

Figure 25B:
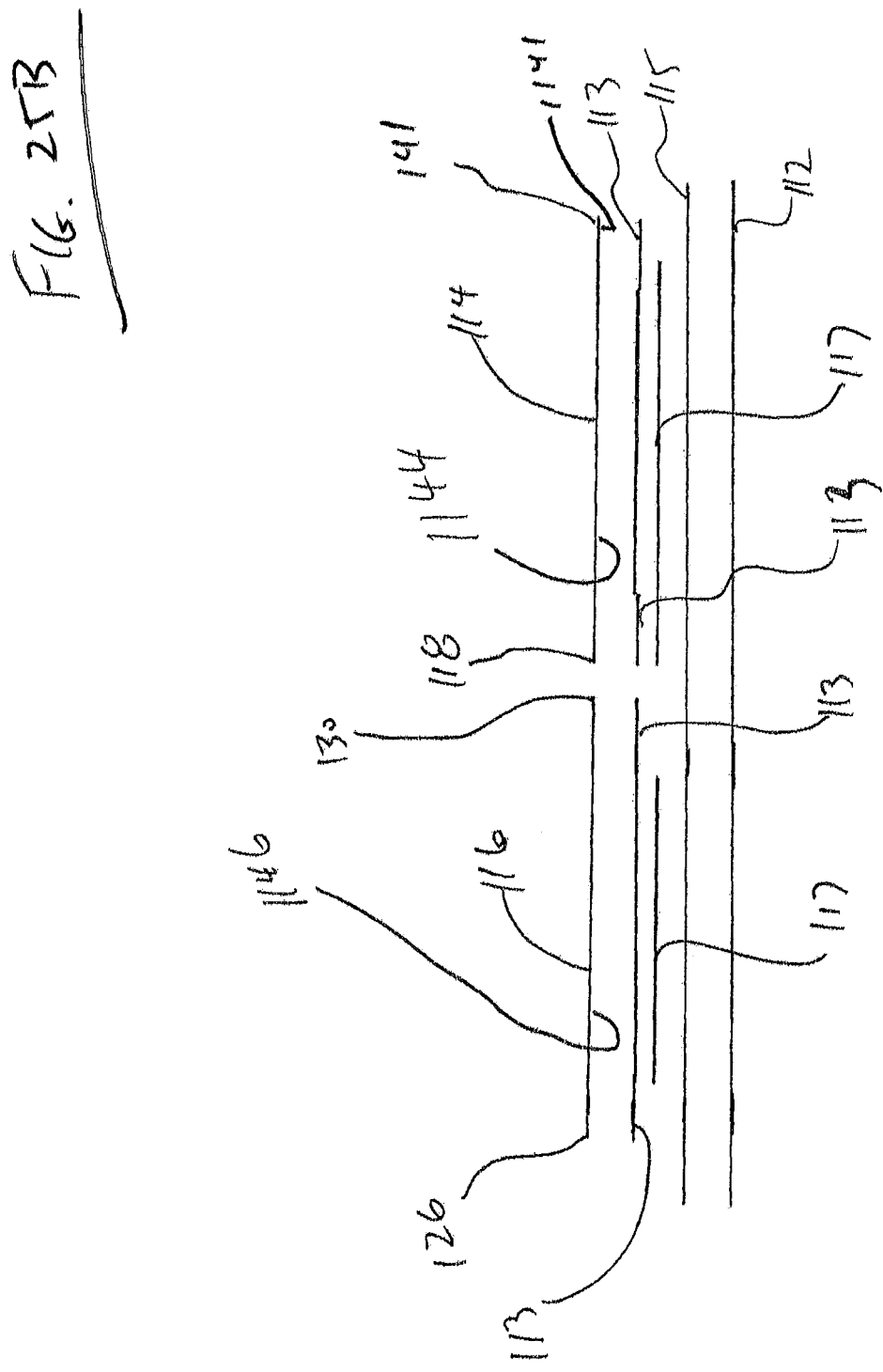

FIG. 25B shows a cross-sectional view of an auto-applied upper and lower label system according to at least one embodiment of the present disclosure taken on line XXV-XXV of FIG. 23. The auto-applied upper and lower label system is shown in FIG. 25B in a semi-exploded state for purposes of clarity. Shown in FIG. 25B are carrier 112, adhesive 113, lower label 114 including leading edge 118, a trailing tab 141 and a segment 1141, release coating 115, upper label 116 including leading edge 126 and trailing edge 130, and adhesive deadening agent 117. In at least one other embodiment of the present disclosure, underside 1144 comprises adhesive 113 on all or substantially all of its surface area, but adhesive deadening agent 117 such as, for example, a non-adhesive varnish, covers adhesive 113 in that area. Second portion 1146 also comprises adhesive 113 on all or substantially all of its surface area, but adhesive deadening agent 117 such as, for example, a non-adhesive varnish, covers adhesive 113 in that area.

Auto-applied upper and lower label system 103 according to at least one embodiment of the present disclosure may be automatically applied to a surface through the use of apparatuses and processes substantially similar to the apparatuses and processes shown and described in FIGS. 12A-15 and this written description. Auto-applied upper and lower label system 102 according to at least one embodiment of the present disclosure may be used in a manner substantially similar to manner shown and described in FIGS. 16A-16B and this written description, provided that when removable region 144 is removed the surface to which it is applied, removable region 144 is separated from lower label 114 along lines of weakness 136 and 137, and by tearing trailing tabs 141.

While this disclosure has been described as having preferred designs, the apparatus and methods according to the present disclosure can be further modified within the scope and spirit of this disclosure. This application is therefore intended to cover any variations, uses, or adaptations of the disclosure using its general principles. For example, any method disclosed herein and in the appended claims represent one possible sequence of performing the steps thereof. A practitioner may determine in a particular implementation that a plurality of steps of one or more of the disclosed methods may be combinable, or that a different sequence of steps may be employed to accomplish the same results. Each such implementation falls within the scope of the present disclosure as disclosed herein and in the appended claims. Furthermore, this application is intended to cover such departures from the present disclosure as come within known or customary practice in the art to which this disclosure pertains.

We claim:

1. A method of applying a lower label and an upper label to a surface, the method comprising the steps of:
    providing a carrier material, said carrier material comprising an upper label thereon and a lower label thereon in a position on said carrier material adjacent to said upper label, said lower label comprising a top side and an opposing underside, said underside facing said carrier material, said upper label comprising a top surface and an opposing undersurface, said undersurface facing said carrier material;
    dispensing said upper label onto a label applicator apparatus, whereby said top surface of said upper label is held in position against said label applicator apparatus and said undersurface is exposed; and
    while said upper label is held in position against said label applicator apparatus, dispensing said lower label onto said label applicator apparatus, whereby said top side of said lower label is held in position against said undersurface of said upper label.

2. The method of claim 1, wherein said upper label comprises a removable segment, and wherein said lower label comprises a removable region, and wherein after said lower label is dispensed onto said label applicator apparatus, said removable segment and said removable region are in registration.

3. The method of claim 1, wherein said undersurface comprises a zone with reduced adhesive properties, and wherein said underside comprises an area with reduced adhesive properties, and wherein after said lower label is dispensed onto said label applicator apparatus, said zone with reduced adhesive properties and said area with reduced adhesive properties are in registration.

4. The method of claim 3, wherein said zone with reduced adhesive properties comprises an adhesive layer covered with an adhesive deadening agent.

5. The method of claim 3, wherein said area with reduced adhesive properties comprises an adhesive layer covered with an adhesive deadening agent.

6. The method of claim 1, wherein said upper label is held in position against said label applicator apparatus by a vacuum force generated by said label applicator apparatus.

7. The method of claim 6, wherein said upper label comprises one or more holes therethrough, and wherein said lower label is held in position against said undersurface of said upper label by said vacuum force generated by said label applicator apparatus, said vacuum force acting through said one or more holes.

8. The method of claim 1, wherein said lower label is held in position against said undersurface of said upper label by a vacuum force generated by said label applicator apparatus.

9. The method of claim 1, wherein all of said underside comprises reduced adhesive properties.

10. The method of claim 1, wherein all of said underside comprises an adhesive layer covered with an adhesive deadening agent.

11. The method of claim 1, wherein said undersurface comprises pressure sensitive adhesive that removeably adheres said undersurface to said carrier material.

12. A method of applying a lower label and an upper label to a surface, the method comprising the steps of:
    providing a carrier material, said carrier material comprising an upper label removeably adhered thereto and a lower label removeably adhered thereto in a position on said carrier adjacent to said upper label, said upper label comprising a top surface, an undersurface, a removable segment, said upper label being bounded by a leading edge, a trailing edge, and first and second side edges, said undersurface comprising adhesive on at least a portion thereof, said undersurface removeably adhered to said carrier material by said adhesive, said lower label comprising a top side and an opposing underside, said lower label being bounded by a leading margin, a trailing margin, and first and second side margins;
    dispensing said upper label onto a label applicator apparatus, whereby said top surface of said upper label is held in position against said label applicator apparatus and said undersurface is exposed;
    advancing said lower label toward said label applicator apparatus; and
    while said upper label is held in position against said label applicator apparatus, dispensing said lower label onto said label applicator apparatus, whereby said top side of said lower label is held in position against said undersurface of said upper label, and whereby said adhesive on said undersurface of said upper label adhesively interacts with said top side of said lower label.

13. The method of claim 12, wherein said lower label further comprises a removable region, and wherein after said lower label is dispensed onto said label applicator apparatus, said removable segment and said removable region are in registration.

14. The method of claim 12, wherein said undersurface comprises a zone with reduced adhesive properties, and wherein said underside comprises an area with reduced adhesive properties, and wherein after said lower label is dispensed onto said label applicator apparatus, said zone with reduced adhesive properties and said area with reduced adhesive properties are in registration.

15. The method of claim 12, wherein all of said underside comprises reduced adhesive properties.

16. The method of claim 12, wherein all of said underside comprises an adhesive layer covered with an adhesive deadening agent.

17. The method of claim 12, wherein said upper label is held in position against said label applicator apparatus by a vacuum force generated by said label applicator apparatus.

18. The method of claim 17, wherein said upper label comprises one or more holes therethrough, and wherein said lower label is held in position against said undersurface of said upper label by said vacuum force generated by said label applicator apparatus, said vacuum force acting through said one or more holes.

19. The method of claim 12, wherein said lower label is held in position against said undersurface of said upper label by a vacuum force generated by said label applicator apparatus.

20. A method of applying a lower label and an upper label to a container, the method comprising the steps of:
providing a carrier material, said carrier material comprising an upper label removeably adhered thereto and a lower label removeably adhered thereto in a position on said carrier adjacent to said upper label, said carrier material comprising a release coating on a surface thereof, said lower label comprising a top side and an opposing underside, said top side and said underside being bounded by a leading margin, a trailing margin, and first and second side margins, said top side comprising a first surface area being bounded by said leading margin, said trailing margin, and said first and second side margins, said underside comprising adhesive on at least a portion thereof, said underside removeably adhered to said release coating by said adhesive, said upper label comprising a top surface, an undersurface, and a removable segment, said top surface and said undersurface being bounded by a leading edge, a trailing edge, and first and second side edges, said top surface comprising a second surface area circumscribed by said leading edge, said trailing edge, and said first and second side edges, said second surface area being no larger than said first surface area, said undersurface comprising adhesive on at least a portion thereof, said undersurface removeably adhered to said release coating by said adhesive;
dispensing said upper label onto a label applicator apparatus, whereby said top surface of said upper label is held in position against said label applicator apparatus and said undersurface is exposed;
advancing said lower label toward said label applicator apparatus; and
while said upper label is held in position against said label applicator apparatus, dispensing said lower label onto said label applicator apparatus, whereby said top side of said lower label is held in position against said undersurface of said upper label.

21. The method of claim 20, wherein said lower label further comprises a removable region, and wherein after said lower label is dispensed onto said label applicator apparatus, said removable segment and said removable region are in registration.

22. The method of claim 20, wherein said undersurface comprises a zone with reduced adhesive properties, and wherein said underside comprises an area with reduced adhesive properties, and wherein after said lower label is dispensed onto said label applicator apparatus, said zone with reduced adhesive properties and said area with reduced adhesive properties are in registration.

23. The method of claim 20, wherein said upper label is held in position against said label applicator apparatus by a vacuum force generated by said label applicator apparatus.

24. The method of claim 23, wherein said lower label is held in position against said undersurface of said upper label by said vacuum force generated by said label applicator apparatus.

25. The method of claim 20, wherein said lower label is held in position against said undersurface of said upper label by a vacuum force generated by said label applicator apparatus.

26. The method of claim 20, wherein after said lower label is dispensed onto said label applicator apparatus, said leading edge, said trailing edge, and said first and second side edges are not outside of said leading margin, said trailing margin, and said first and second side margins, respectively.

27. The method of claim 20, wherein after said lower label is dispensed onto said label applicator apparatus, said leading edge, said first side edge, and said second side edge are inboard of said leading margin, said first side margin, and said second side margin, respectively.

28. A method of applying a lower sheet and an upper label to a surface, the method comprising the steps of:
providing a carrier material, said carrier material comprising a removable upper label thereon and a removable lower sheet thereon in a position on said carrier material adjacent to said upper label, said lower sheet comprising a top side and an opposing underside, said underside facing said carrier material, said upper label comprising a top surface and an opposing undersurface, said undersurface facing said carrier material;
dispensing said upper label onto a label applicator apparatus, whereby said top surface of said upper label is held in position against said label applicator apparatus and said undersurface is exposed; and
while said upper label is held in position against said label applicator apparatus, dispensing said lower sheet onto said label applicator apparatus, whereby said top side of said lower sheet is held in position against said undersurface of said upper label.

29. The method of claim 28, wherein said upper label comprises a removable segment, and wherein said lower sheet comprises a removable region, and wherein after said lower sheet is dispensed onto said label applicator apparatus, said removable segment and said removable region are in registration.

30. The method of claim 28, wherein said undersurface comprises a zone with reduced adhesive properties, and wherein said underside comprises an area with reduced adhesive properties, and wherein after said lower sheet is dispensed onto said label applicator apparatus, said zone with reduced adhesive properties and said area with reduced adhesive properties are in registration.

31. The method of claim 30, wherein said zone with reduced adhesive properties comprises an adhesive layer covered with an adhesive deadening agent.

32. The method of claim 30, wherein said area with reduced adhesive properties comprises an adhesive layer covered with an adhesive deadening agent.

33. The method of claim 28, wherein said upper label is held in position against said label applicator apparatus by a vacuum force generated by said label applicator apparatus.

34. The method of claim 30, wherein said upper label comprises one or more holes therethrough, and wherein said lower sheet is held in position against said undersurface of said upper label by said vacuum force generated by said label applicator apparatus, said vacuum force acting through said one or more holes.

35. The method of claim 28, wherein said lower sheet is held in position against said undersurface of said upper label by a vacuum force generated by said label applicator apparatus.

36. The method of claim 28, wherein all of said underside comprises reduced adhesive properties.

37. The method of claim 28, wherein all of said underside comprises an adhesive layer covered with an adhesive deadening agent.

38. The method of claim 28, wherein after said lower sheet is dispensed onto said label applicator apparatus, said adhesive on said undersurface of said upper label adhesively interacts with said top side of said lower sheet.

* * * * *